US012682564B2

(12) United States Patent
Shin et al.

(10) Patent No.: US 12,682,564 B2
(45) Date of Patent: Jul. 14, 2026

(54) DEVICE FOR OUTPUTTING OBJECT-BASED FEEDBACK, OPERATING METHOD THEREOF, AND RECORDING MEDIUM

(71) Applicant: Samsung Electronics Co., Ltd., Suwon-si (KR)

(72) Inventors: Hoseon Shin, Suwon-si (KR); Taegu Kim, Suwon-si (KR); Gajin Song, Suwon-si (KR); Jaeyung Yeo, Suwon-si (KR); Eunkyung Lee, Suwon-si (KR); Hyeoncheon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 18/680,290

(22) Filed: May 31, 2024

(65) Prior Publication Data

US 2025/0029325 A1 Jan. 23, 2025

Related U.S. Application Data

(63) Continuation of application No. PCT/KR2024/006590, filed on May 14, 2024.

(30) Foreign Application Priority Data

Jul. 18, 2023 (KR) ........................ 10-2023-0093304
Aug. 11, 2023 (KR) ........................ 10-2023-0105657

(51) Int. Cl.
*G06T 15/00* (2011.01)
*G06T 7/20* (2017.01)
(Continued)

(52) U.S. Cl.
CPC ................ *G06T 17/00* (2013.01); *G06T 7/20* (2013.01); *G06V 10/25* (2022.01); *G06V 2201/07* (2022.01)

(58) Field of Classification Search
CPC ....... G06T 19/00; G06T 15/005; G06T 17/20; G06T 17/00; G06T 15/10; G06T 15/00;
(Continued)

(56) References Cited

U.S. PATENT DOCUMENTS 10,586,369 B1 * 3/2020 Roche ..................... G10L 13/00
10,921,896 B2 2/2021 Lopez et al.
(Continued)

FOREIGN PATENT DOCUMENTS

KR 10-2015-0054825 5/2015
KR 10-2015-0059466 6/2015
(Continued)

OTHER PUBLICATIONS

Search Report dated Aug. 23, 2024 in International Patent Application No. PCT/KR2024/006590 and English-language translation.

*Primary Examiner* — Gordon G Liu
(74) *Attorney, Agent, or Firm* — Nixon & Vanderhye, P.C.

(57) ABSTRACT

An example electronic device may include a memory configured to store computer-executable instructions, and a processor configured to execute the instructions by accessing the memory. The instructions are configured to, when executed, cause the processor to generate, based on obtaining an input of a user, first feedback on the input, generate, based on an object detected in at least one of a display region, a surrounding physical space, or a virtual space, second feedback following the first feedback, and output the first feedback and the second feedback.

20 Claims, 14 Drawing Sheets

(51) Int. Cl.
*G06T 17/00* (2006.01)
*G06V 10/25* (2022.01)

(58) Field of Classification Search
CPC ......... G06T 13/40; G06T 15/06; G06T 15/08;
G06T 15/20; G06T 15/04; G06T 2210/41;
G06T 1/20; G06T 19/006; G06T 7/337;
G06T 7/50; G06T 7/74; G06T 19/20;
G06T 2200/04; G06T 2207/10016; G06T
2207/30244; G06T 2219/024; G06T
2219/2016; G06T 2210/12; G06T
2210/21; G06T 7/70; G06T 2207/20084;
G06T 1/60; G06T 13/20; G06T 7/20;
H04N 23/57; H04N 23/90; H04N 23/64;
H04N 23/611; H04N 23/635; H04N
7/147; H04N 7/157; G06F 16/51; G06F
21/602; G06F 3/013; G06F 3/012; G06F
3/011; G06F 3/017; G06F 3/167; G06V
20/20; G06V 10/25; G06V 2201/07;
B33Y 50/00
USPC .......................................................... 345/419
See application file for complete search history.

(56) References Cited

U.S. PATENT DOCUMENTS

| | | | |
|---|---|---|---|
| 11,132,840 B2 | 9/2021 | Sarangdhar et al. | |
| 11,328,484 B2 | 5/2022 | Powderly et al. | |
| 2016/0274762 A1* | 9/2016 | Lopez | G06T 19/006 |
| 2018/0046851 A1* | 2/2018 | Kienzle | B60K 35/235 |
| 2018/0150709 A1* | 5/2018 | Ha | G06V 10/17 |
| 2024/0111359 A1* | 4/2024 | Ishihara | G06F 3/017 |
| 2025/0138726 A1* | 5/2025 | Dahlgren | G06V 40/28 |

FOREIGN PATENT DOCUMENTS

| | | |
|---|---|---|
| KR | 20170100309 A | 9/2017 |
| KR | 10-2017-0130602 | 11/2017 |
| KR | 10-2019-0141696 | 12/2019 |
| KR | 102227392 B1 | 3/2021 |
| KR | 102248474 B1 | 5/2021 |
| KR | 20210082006 A | 7/2021 |
| KR | 10-2021-0130832 | 11/2021 |

* cited by examiner

500

The highest temperature of today will be 30 degrees and
the lowest temperature will be 20 degrees.
It will be cloudy all day.

The air quality is bad today. How about turning on
the air purifier that is turned off?

The air quality is bad but the window is open.
You can close the window.

600b

610b

650b

630b

661b

The highest temperature of today will be 30 degrees and
the lowest temperature will be 20 degrees.
It will be cloudy all day.

662b

Today is hotter than yesterday. How about turning
the air conditioner on?

941

The highest temperature of today will be 30 degrees
and the lowest temperature will be 20 degrees.

942-1

It's hot. How about turning the air conditioner on?

942-2

The air quality is bad. How about turning
the air purifier on?

942-3

It's cloudy. How about turning the light on?

The highest temperature of today will be 30 degrees and the lowest temperature will be 20 degrees.

It's cloudy. How about turning the light on?

DEVICE FOR OUTPUTTING OBJECT-BASED FEEDBACK, OPERATING METHOD THEREOF, AND RECORDING MEDIUM

CROSS-REFERENCE TO RELATED APPLICATIONS

This application is a continuation application of International Application No. PCT/KR2024/006590 designating the United States, filed on May 14, 2024, in the Korean Intellectual Property Receiving Office and claiming priority to Korean Patent Application No. 10-2023-0093304, filed on Jul. 18, 2023 and Korean Patent Application No. 10-2023-0105657, filed on Aug. 11, 2023, in the Korean Intellectual Property Office, the disclosures of which are incorporated by reference herein in their entireties.

BACKGROUND

1. Field

The disclosure relates to a device for outputting object-based feedback, an operation method thereof, and a recording medium.

2. Description of Related Art

Recently, virtual reality (VR), augmented reality (AR), and mixed reality (MR) technologies utilizing computer graphics technology have been developed. At this time, VR technology refers to, for example, a technology that uses a computer to build a virtual space that does not exist in the real world and then makes a user feel the virtual space like reality, and AR or MR technology refers to, for example, a technology that adds computer-generated information to the real world, that is, a technology that combines the real world and a virtual world to allow real-time interaction with a user.

Among these technologies, AR and MR technologies are utilized in conjunction with technologies in various fields (e.g., a broadcast technology, medical technology, game technology, etc.). Representative examples of integrating augmented-reality technology and using augmented-reality technology in the broadcast technology field include a smoothly changing weather map in front of a weather caster who delivers a weather forecast on television (TV) or an advertisement image, which does not exist in a stadium, inserted into a screen in a sports broadcast and broadcasted as if the advertisement image is real.

A representative service for providing a user with AR or MR is the "metaverse". The metaverse is a compound word of "meta" referring to virtual or abstract and "universe" referring to a world, which refers to three-dimensional VR. The metaverse is a more advanced concept than a typical VR environment and provides an AR environment which absorbs VR, such as the web and the Internet, in the real world.

The above information is presented as related art to help with an understanding of the disclosure. No arguments or decisions are made as to whether any of the above is applicable as a prior art related to the disclosure.

SUMMARY

According to various embodiments, an electronic device may include a memory configured to store computer-executable instructions, and a processor configured to execute the instructions by accessing the memory. The instructions are configured to, when executed, cause the processor to generate, based on obtaining an input of a user, first feedback on the input, generate, based on an object detected in at least one of a display region, a surrounding physical space, or a virtual space, second feedback following the first feedback, and output the first feedback and the second feedback.

According to various embodiments, a method performed by an electronic device may include generating, based on obtaining an input of a user, first feedback on the input, generating, based on an object detected in at least one of a display region, a surrounding physical space, or a virtual space, second feedback following the first feedback, and outputting the first feedback and the second feedback.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
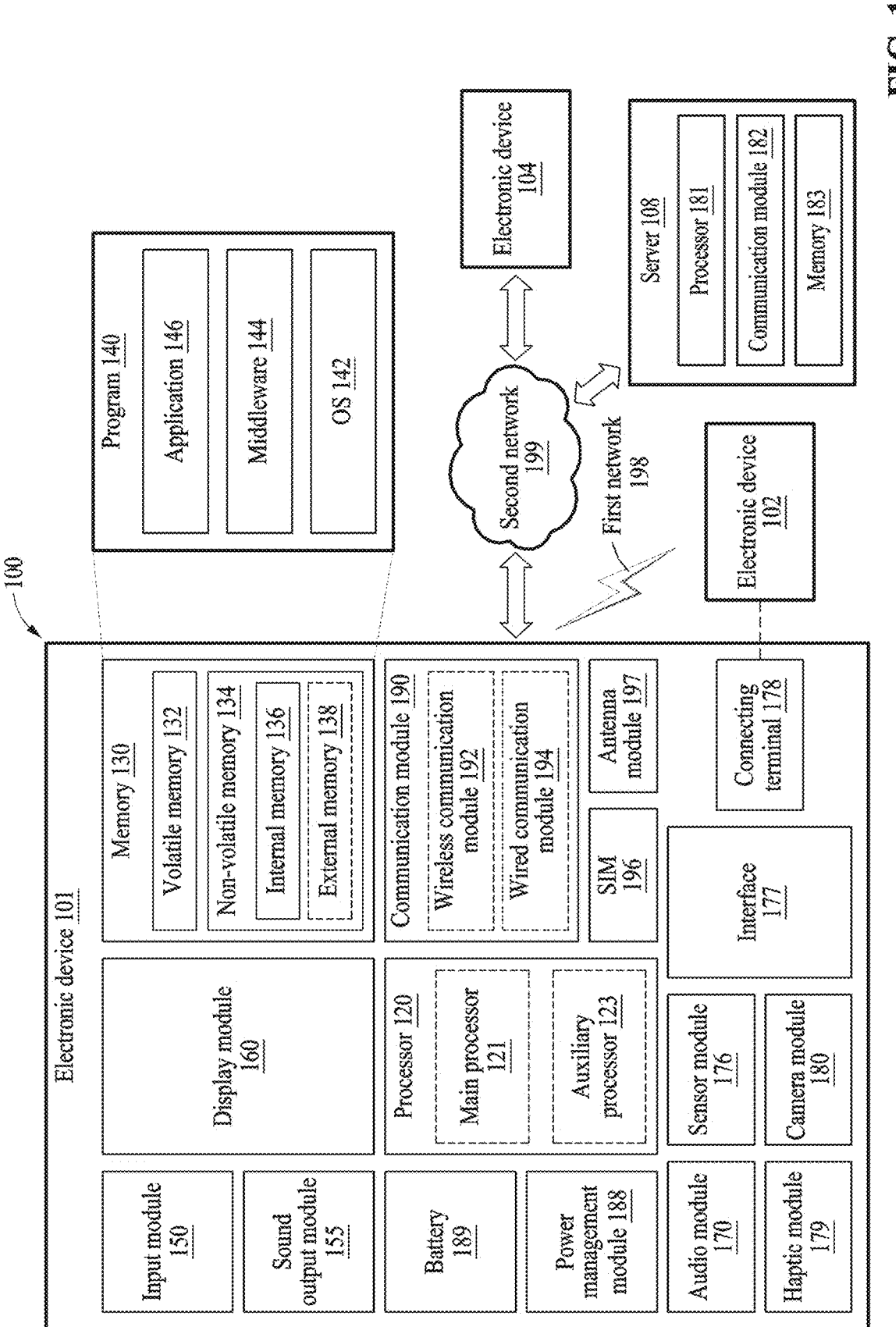
FIG. 1 is a block diagram illustrating a configuration of an example electronic device according to various embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating a configuration of an example electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence (AI) model. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 (e.g., a display) may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199.

Each of the external electronic devices 102 and 104, and the server 108 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. In the disclosure, an example in which the electronic device 101 is an augmented reality (AR) device (e.g., an electronic device 201 of FIG. 2, an electronic device 301 of FIG. 3, or an electronic device 401 of FIG. 4), and the server 108 among the external electronic devices 102 and 104, and the server 108 transmits, to the electronic device 101, a result of executing a virtual space and an additional function or service associated with the virtual space will be mainly described.

The server 108 may include a processor 181 (including, e.g., processing circuitry), a communication module 182 (including, e.g., communication circuitry), and a memory 183. The processor 181, the communication module 182, and the memory 183 may be similarly configured to the processor 120, the communication module 190, and the memory 130 of the electronic device 101. For example, the processor 181 may provide a virtual space and an interaction between users in the virtual space by executing instructions stored in the memory 183. The processor 181 may generate at least one of visual information, auditory information, or tactile information of the virtual space and objects in the virtual space. For example, as the visual information, the processor 181 may generate rendered data (e.g., visual rendered data) obtained by rendering an appearance (e.g., a shape, size, color, and/or texture) of the virtual space and an appearance (e.g., a shape, size, color, and/or texture) of an object positioned in the virtual space. In addition, the processor 181 may generate rendered data obtained by rendering a change (e.g., an appearance change of an object, sound generation, and/or tactile sensation generation) based on at least one of interactions between objects (e.g., a physical object, a virtual object, and/or an avatar object) in the virtual space or a user input for an object (e.g., a physical object, a virtual object, and/or an avatar object). The communication module 182 may establish communication with a first electronic device (e.g., the electronic device 101) of a user and a second electronic device (e.g., the electronic device 102) of another user. The communication module 182 may transmit at least one of the visual information, the auditory information, or the tactile information described above to the first electronic device and/or the second electronic device. For example, the communication module 182 may transmit the rendering data.

Figure 2:
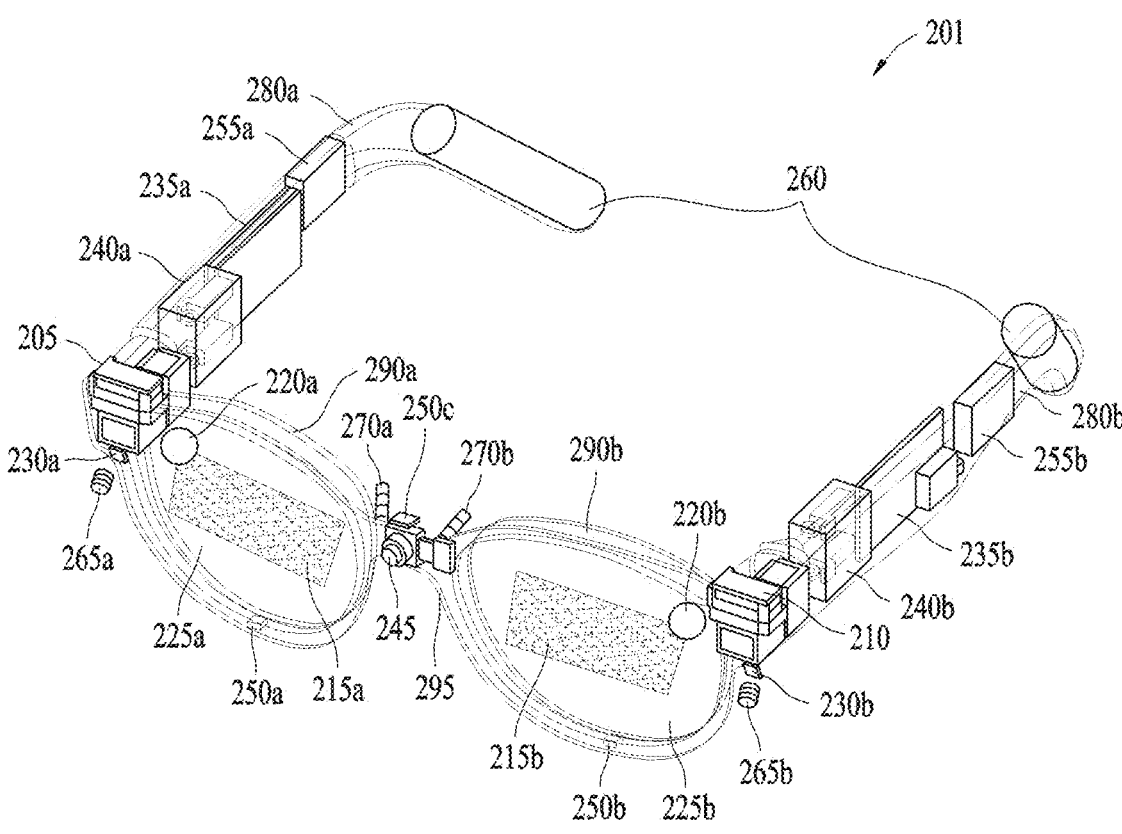
FIG. 2 illustrates an example optical see-through (OST) device according to various embodiments.

For example, the server 108 may render content data executed in an application and transmit the rendered content data to the electronic device 101, and the electronic device 101 receiving the data may output the content data to the display module 160. If the electronic device 101 detects a user movement through an inertial measurement unit (IMU) sensor, the processor 120 of the electronic device 101 may correct rendered data received from the external electronic device 102 based on information of the motion, and output the data to the display module 160. Alternatively, the processor may transmit the movement information to the server 108 to request rendering such that screen data is updated accordingly. However, embodiments are not limited thereto, and the rendering may be performed by various types of external electronic devices (e.g., 102 and 104) such as a smartphone or a case device or dock for storing and charging the electronic device 101. The rendering data corresponding to the virtual space generated by the external electronic devices 102 and 104 may be provided to the electronic device 101. In an example, the electronic device 101 may receive virtual spatial information (e.g., vertex coordinates, texture, and color defining a virtual space) and object information (e.g., vertex coordinates, texture, and color defining an appearance of an object) from the server 108 and perform rendering by itself based on the received data. FIG. 2 illustrates an example optical see-through (OST) device according to various embodiments.

An electronic device 201 may include at least one of a display (e.g., the display module 160 of FIG. 1), a vision sensor, light sources 230a and 230b, an optical element, or a substrate. The electronic device 201 including a transparent display and providing an image through the transparent display may be referred to as an OST device.

For example, the display may include a liquid crystal display (LCD), a digital mirror device (DMD), a liquid crystal on silicon (LCoS), an organic light-emitting diode (OLED), or a micro light-emitting diode (micro-LED).

In an embodiment, when the display is one of an LCD, a DMD, or an LCOS, the electronic device 201 may include the light sources 230a and 230b configured to emit light to a screen output area (e.g., screen display portions 215a and 215b) of the display. In an embodiment, when the display is capable of generating light by itself, for example, when the display is either the OLED or the micro-LED, the electronic device 201 may provide a virtual image with a relatively high quality to a user even though the separate light sources 230a and 230b are not included. For example, when the display is implemented as an OLED or a micro-LED, the light sources 230a and 230b may be unnecessary, which may lead to reduced weight of the electronic device 201.

Referring to FIG. 2, the electronic device 201 may include the display, a first transparent member 225a, and/or a second transparent member 225b, and the user may use the electronic device 201 while wearing the electronic device 201 on his/her face. The first transparent member 225a and/or the second transparent member 225b may be formed of a glass plate, a plastic plate, or a polymer, and may be transparently or translucently formed. According to an embodiment, the first transparent member 225a may be disposed to face the right eye of the user, and the second transparent member 225b may be disposed to face the left eye of the user. The display may include a first display 205 configured to output a first image (e.g., a right image) corresponding to the first transparent member 225a, and a second display 210 configured to output a second image (e.g., a left image) corresponding to the second transparent member 225b. According to an embodiment, when each display is transparent, the displays and the transparent members may be disposed to face the eyes of the user to configure the screen display portions 215a and 215b.

In an embodiment, a light path of light emitted from the displays 205 and 210 may be guided by a waveguide through the input optical members 220a and 220b. Light moving into the waveguide may be guided toward eyes of a user through an output optical member (e.g., an output optical member 340 of FIG. 3). The screen display portions 215a and 215b may be determined based on light emitted toward the eyes of the user.

For example, the light emitted from the displays 205 and 210 may be reflected from a grating region of the waveguide formed in the input optical members 220a and 220b and the screen display portions 215a and 215b, and may be transmitted to the eyes of the user.

The optical element may include at least one of a lens or an optical waveguide.

The lens may adjust a focus such that a screen output to the display may be visible to the eyes of the user. The lens may include, for example, at least one of a Fresnel lens, a pancake lens, or a multichannel lens.

The optical waveguide may transmit image rays generated by the display to the user's eyes. For example, the image rays may represent rays of light emitted by the light sources 230a and 230b, that have passed through the screen output area of the display. The optical waveguide may be formed of glass, plastic, or a polymer. The optical waveguide may have a nanopattern formed on one inside surface or one outside surface, for example, a grating structure of a polygonal or curved shape. An example structure of the optical waveguide will be described below with reference to FIG. 3.

The vision sensor may include at least one of a camera sensor or a depth sensor.

First cameras 265a and 265b are cameras for recognition and may be cameras used for 3 degree of freedom (DoF) and 6 DoF head tracking, hand detection, hand tracking, and spatial recognition. The first cameras 265a and 265b may, for example, include a global shutter (GS) camera. Since a stereo camera is required for head tracking and spatial recognition, the first cameras 265a and 265b may include two or more GS cameras. A GS camera may have a more excellent performance compared to a rolling shutter (RS) camera, in terms of detecting and tracking a fine movement, such as a quick movement of a hand or a finger. For example, the GS camera may have a low image blur. The first cameras 265a and 265b may capture image data used for spatial recognition for 6 DoF and a simultaneous localization and mapping (SLAM) function through depth imaging. In addition, a user gesture recognition function may be performed based on image data captured by the first camera 265a and 265b.

Second cameras 270a and 270b, which are eye tracking (ET) cameras, may be used to capture image data for detecting and tracking the pupils of the user. The second cameras 270a and 270b will be described below with reference to FIG. 3.

A third camera 245 may be a camera for image capturing. The third camera 245 may include a high-resolution (HR) camera to capture an HR image or a photo video (PV) image. The third camera 245 may include a color camera having functions for obtaining a high-quality image, such as an automatic focus (AF) and an optical image stabilization (OIS). The third camera 245 may be a GS camera or an RS camera.

A fourth camera (e.g., face recognition cameras 425 and 426 of FIG. 4 below) is a face recognition camera, and a face tracking (FT) camera may be used to detect and track facial expressions of the user.

A depth sensor (not shown) may be, for example configured to sense information for determining a distance to an object such as time of flight (TOF). The TOF may refer to, for example, a technology for measuring a distance to an object using a signal (e.g., a near infrared ray, ultrasound, laser, etc.). A TOF-based depth sensor may transmit a signal from a transmitter and measure the signal by a receiver, thereby measuring a TOF of the signal.

The light sources 230a and 230b (e.g., illumination modules) may include an element (e.g., an LED) configured to emit light of various wavelengths. The illumination module may be attached to various positions depending on the purpose of use. In an example, a first illumination module (e.g., an LED element), attached around a frame of an AR glasses device, may emit light for assisting gaze detection when tracking a movement of the eyes with an ET camera. The first illumination module may include, for example, an IR LED of an infrared wavelength. In an example, a second illumination module (e.g., an LED element) may be attached around hinges 240a and 240b respectively connecting frames (e.g., a first frame 290a and a second frame 290b) and temples (e.g., a first temple 280a and a second temple 280b) or attached in proximity to a camera mounted around a bridge 295 connecting the frames. The second illumination module may emit light for supplementing ambient brightness when the camera captures an image. When it is not easy to detect a subject in a dark environment, the second illumination module may emit light.

Substrates 235a and 235b (e.g., printed-circuit boards (PCBs)) may support the components described above.

The PCB may be disposed on temples of the glasses. A flexible PCB (FPCB) may transmit an electrical signal to each module (e.g., a camera, a display, an audio module, and a sensor module) and another PCB. According to an embodiment, at least one PCB may include a first substrate, a second substrate, and an interposer disposed between the first substrate and the second substrate. An electrical signal may be transmitted to each module and the other PCB.

The other components may include, for example, at least one of a plurality of microphones (e.g., a first microphone 250a, a second microphone 250b, and a third microphone 250c), a plurality of speakers (e.g., a first speaker 255a and a second speaker 255b), a battery 260, an antenna, or a sensor (e.g., an acceleration sensor, a gyro sensor, a touch sensor, etc.).

Figure 3:
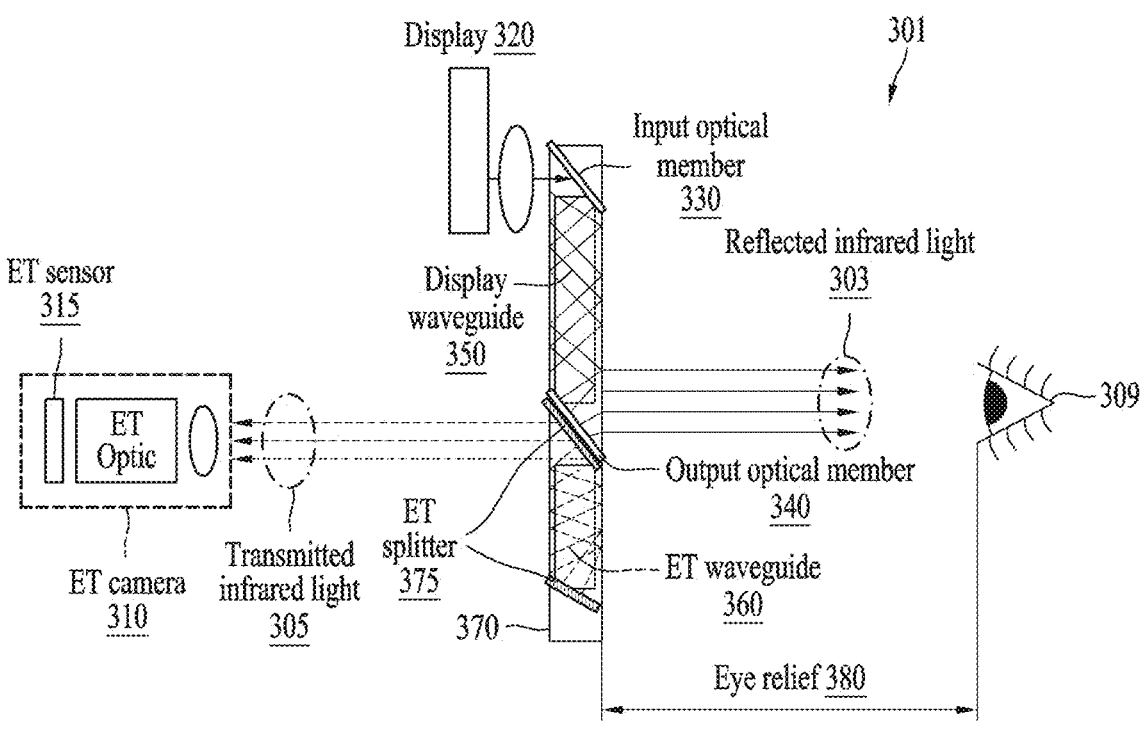
FIG. 3 illustrates an example optical system of an eye-tracking (ET) camera, a transparent member, and a display according to various embodiments.

FIG. 3 illustrates an example optical system of an ET camera, a transparent member, and a display according to various embodiments.

FIG. 3 is a diagram illustrating an operation of an example ET camera included in an electronic device according to various embodiments. FIG. 3 illustrates a process in which an ET camera 310 (e.g., the second cameras 270a and 270b of FIG. 2) of an electronic device 301 according to an embodiment tracks an eye 309 of a user, e.g., a gaze of the user, using light (e.g., infrared light) output from a display 320 (e.g., the first display 205 and the second display 210 of FIG. 2).

A second camera (e.g., the second cameras 270a and 270b of FIG. 2) may be the ET camera 310 that collects information for positioning a center of a virtual image projected onto the electronic device 301 according to a direction at which pupils of a wearer of the electronic device 301 gaze. The second camera may also include a GS camera to detect the pupils and track a rapid movement of the pupils. The ET cameras may be installed for a right eye and a left eye, and the ET cameras having substantially the same camera performance and specifications may be used. The ET camera 310 may include an ET sensor 315. The ET sensor 315 may be included inside the ET camera 310. The infrared light output from the display 320 may be transmitted as a reflected infrared light 303 to the eye 309 of the user by a half mirror. The ET sensor 315 may detect a transmitted infrared light 305 that is generated when the reflected infrared light 303 is reflected from the eye 309 of the user. The ET camera 310 may track the eye 309 of the user, that is, the gaze of the user, based on a result of the detection by the ET sensor 315.

The display 320 may include a plurality of visible light pixels and a plurality of infrared pixels. The visible light pixels may include red (R), green (G), and blue (B) pixels. The visible light pixels may output visible light corresponding to a virtual object image. The infrared pixels may output infrared light. The display 320 may include, for example, micro LEDs, or OLEDs.

A display waveguide 350 and an ET waveguide 360 may be included in a transparent member 370 (e.g., the first transparent member 225a and the second transparent member 225b of FIG. 2). The transparent member 370 may be formed as, for example, a glass plate, a plastic plate, or a polymer, and may be transparently or translucently formed. The transparent member 370 may be disposed to face an eye of a user. In this case, a distance between the transparent member 370 and the eye 309 of the user may be referred to as an "eye relief" 380.

The transparent member 370 may include the display waveguide 350 and the ET waveguide 360. The transparent member 370 may include an input optical member 330 and an output optical member 340. In addition, the transparent member 370 may include an ET splitter 375 that splits the input light into several waveguides.

According to an embodiment, light incident to one end of the display waveguide 350 may be propagated inside the display waveguide 350 by a nanopattern and may be provided to a user. In addition, the display waveguide 350 formed of a free-form prism may provide incident light as an image ray to the user through a reflection mirror. The display waveguide 350 may include at least one of a diffractive element (e.g., a diffractive optical element (DOE) or a holographic optical element (HOE)) or a reflective element (e.g., a reflection mirror). The display waveguide 350 may guide a display light (e.g., the image ray) emitted from the light source to the eyes of the user, using at least one of the diffractive element or the reflective element included in the display waveguide 350. For reference, although FIG. 3 illustrates that the output optical member 340 is separate from the ET waveguide 360, the output optical member 340 may be included in the ET waveguide 360.

According to an embodiment, the diffractive element may include the input optical member 330 and the output optical member 340. For example, the input optical member 330 may refer, for example, to an "input grating region". The output optical member 340 may refer, for example, to an "output grating region". The input grating region may serve as an input end that diffracts (or reflects) light, that is output from a micro-LED, to transmit the light to a transparent member (e.g., the first transparent member and the second transparent member) of a screen display portion. The output grating region may serve as an exit that diffracts (or reflects), to the eyes of the user, the light transmitted to the transparent member (e.g., the first transparent member and the second transparent member) of a waveguide.

According to an embodiment, the reflective element may include a total reflection optical element or a total reflection waveguide for total internal reflection (TIR). For example, TIR, which is one scheme for inducing light, may form an angle of incidence such that light (e.g., a virtual image) entering through the input grating region is completely reflected from one surface (e.g., a specific surface) of the waveguide, to completely transmit the light to the output grating region.

In an embodiment, a light path of the light emitted from the display 320 may be guided by the waveguide through the input optical member 330. The light moving the inside of the waveguide may be guided toward the eyes of the user through the output optical member 340. The screen display portion may be determined based on the light emitted toward the eyes of the user.

Figure 4A:
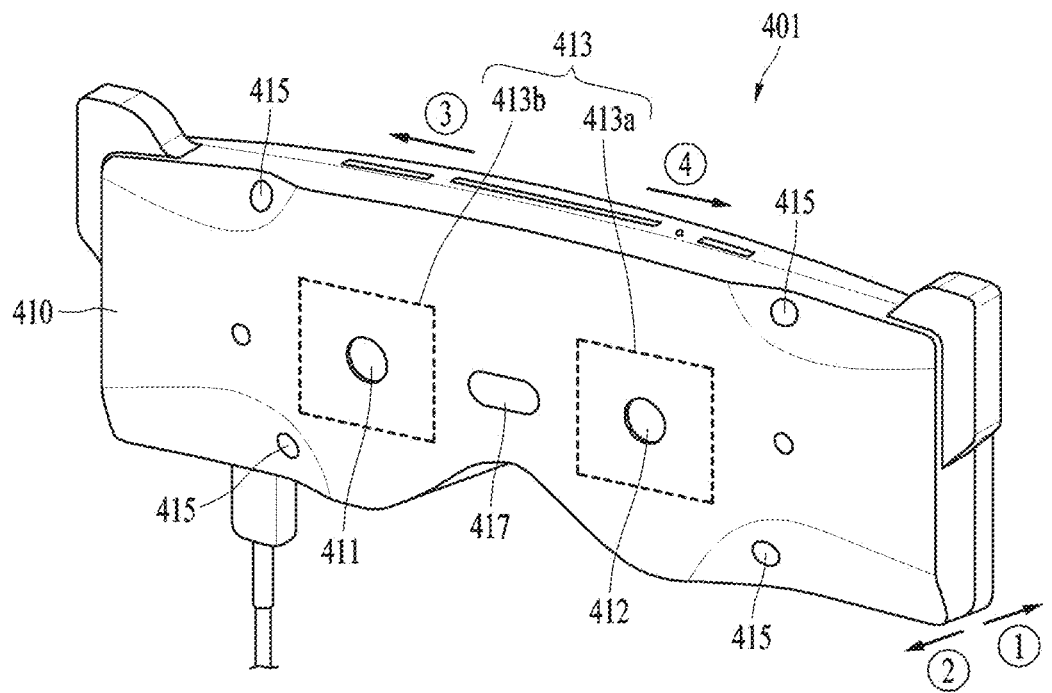
FIGS. 4A and 4B are diagrams illustrating a front view and a rear view of an example electronic device according to various embodiments.
Figure 4B:
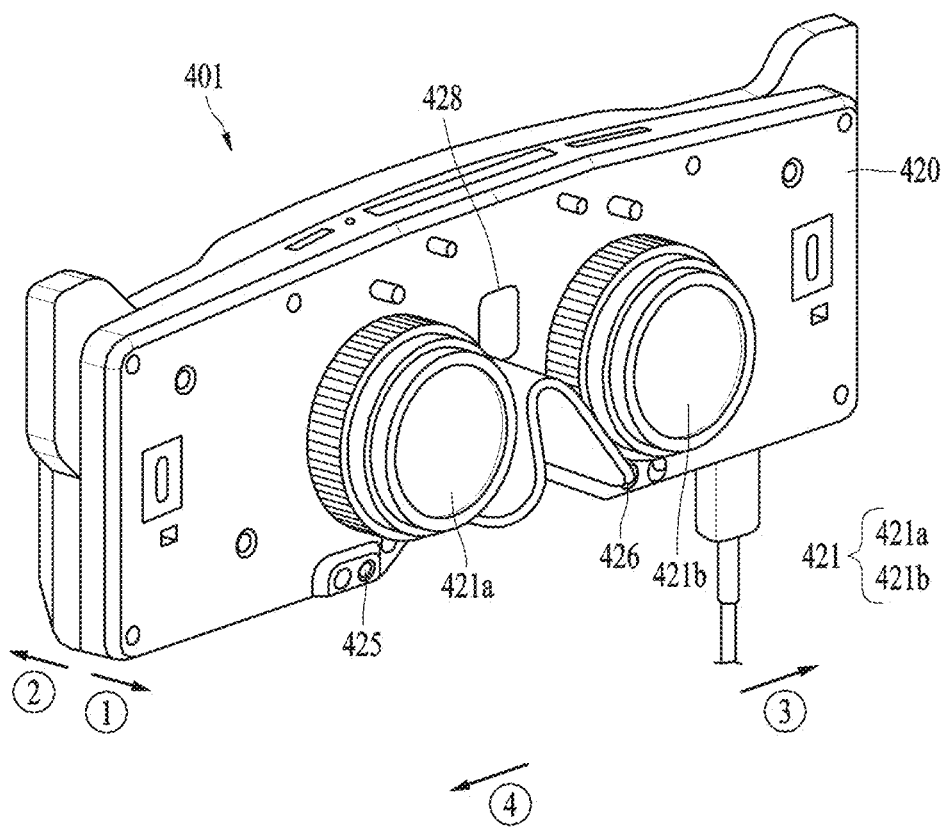

FIGS. 4A and 4B are diagrams illustrating examples of a front view and a rear view of an example electronic device according to various embodiments. FIG. 4A shows an outward form of an example electronic device 401 viewed in a first direction (①), and FIG. 4B shows an outward form of the electronic device 401 viewed in a second direction (②). When a user wears the electronic device 401, an outward form viewed by the eyes of the user may be the one shown in FIG. 4B.

Referring to FIG. 4A, according to various embodiments, the electronic device 401 (e.g., the electronic device 101 of FIG. 1, the electronic device 201 of FIG. 2, or the electronic device 301 of FIG. 3) may provide a service providing an extended reality (XR) experience to the user. For example, XR or XR service may, for example, refer to a service that collectively refers to virtual reality (VR), AR, and/or mixed reality (MR).

According to an embodiment, the electronic device 401 may refer to, for example, a head-mounted device or head-mounted display (HMD) worn on a head of the user but may be provided in the form of at least one of glasses, goggles, a helmet, or a hat. The electronic device 401 may include some types such as an OST type configured such that, when being worn, external light reaches the eyes of the user through glasses or a video see-through (VST) type configured such that, when being worn, light emitted from a display reaches the eyes of the user but external light is blocked not to reach the eyes of the user.

According to an embodiment, the electronic device 401 may be worn on the head of the user and provide images related to an XR service to the user. For example, the electronic device 401 may provide XR content (hereinafter also referred to as an XR content image) output such that at least one virtual object is visible overlapping in a display area or an area determined as a field of view (FoV) of the user. According to an embodiment, the XR content may refer to, for example, an image related to a real space obtained through a camera (e.g., an image capturing camera) or an image or video in which at least one virtual object is added to a virtual space. According to an embodiment, the electronic device 401 may provide XR content based on a function being performed by the electronic device 401 and/or a function being performed by at least one or more external electronic devices of external electronic devices (e.g., the electronic devices 102 and 104 of FIG. 1 and the server 108 of FIG. 1).

According to an embodiment, the electronic device 401 may be at least partially controlled by an external electronic device (e.g., the electronic device 102 or 104 of FIG. 1), or may perform at least one function under the control of the external electronic device or perform at least one function independently.

Referring to FIG. 4A, a vision sensor may be disposed on a first surface of a housing of a main body 410 of the electronic device 401. The vision sensor may include cameras (e.g., second function cameras 411 and 412, and first function cameras 415) and/or a depth sensor 417 for obtaining information related to a surrounding environment of the electronic device 401.

In an embodiment, the second function cameras 411 and 412 may obtain images related to the surrounding environment of the electronic device 401. With a wearable electronic device worn by the user, the first function cameras 415 may obtain images. The first function cameras 415 may be used for hand detection and tracking, and recognition of gestures (e.g., hand gestures) of the user. The first function cameras 415 may be used for 3 DoF and 6 DoF head tracking, position (space, environment) recognition, and/or movement recognition. In an embodiment, the second function cameras 411 and 412 may also be used for hand detection and tracking, and the recognition of user gestures.

In an embodiment, the depth sensor 417 may be configured to transmit a signal and receive a signal reflected from an object, and may be used to determine a distance to the object based on a TOF. Alternatively of or additionally, the cameras 411, 412, and 415 may determine the distance to the object in place of the depth sensor 417.

Referring to FIG. 4B, face recognition cameras 425 and 426 and/or a display 421 (and/or a lens) may be disposed on a second surface 420 of the housing of the main body 410.

In an embodiment, the face recognition cameras 425 and 426 adjacent to a display may be used to recognize a face of the user or may recognize and/or track both eyes of the user.

In an embodiment, the display 421 (and/or a lens) may be disposed on the second surface 420 of the electronic device 401. In an embodiment, the electronic device 401 may not include some of the plurality of cameras 415. Although not shown in FIGS. 4A and 4B, the electronic device 401 may further include at least one of the components shown in FIG. 2.

According to an embodiment, the electronic device 401 may include the main body 410 on which at least some of the components of FIG. 1 are mounted, the display 421 (e.g., the display module 160 of FIG. 1) disposed in the first direction ①of the main body 410, the first function camera 415 (e.g., a recognition camera) disposed in the second direction ②of the main body 410, the second function cameras 411 and 412 (e.g., image capturing cameras) disposed in the second direction ②, a third function camera 428 (e.g., an ET camera) disposed in the first direction ①, fourth function cameras 425 and 426 (e.g., face recognition cameras) disposed in the first direction ①, the depth sensor 417 disposed in the second direction ②, and a touch sensor 413 disposed in the second direction ②. Although not shown in the drawings, the main body 410 may include a memory (e.g., the memory 130 of FIG. 1) and a processor (e.g., the processor 120 of FIG. 1) therein, and may further include other components shown in FIG. 1.

According to an embodiment, the display 421 may include an LCD, a DMD, a LCoS device, an OLED, or a micro-LED.

In an embodiment, when the display 421 is one of an LCD, a DMD, or an LCoS device, the electronic device 401 may include a light source that emits light to a screen output area of the display 421. In an embodiment, when the display 421 is capable of generating light by itself, for example, when the electronic device 401 is formed of one of an OLED or a micro-LED, the electronic device 401 may provide an XR content image with a relatively high quality to the user, even though a separate light source is not included. In an embodiment, when the display 421 is implemented as an OLED or a micro-LED, a light source may be unnecessary, which may lead to lightening of the electronic device 401.

According to an embodiment, the display 421 may include a first transparent member 421*a* and/or a second transparent member 421*b*. The user may use the electronic device 401 with it worn on the face. The first transparent member 421*a* and/or the second transparent member 421*b* may be formed of a glass plate, a plastic plate, or a polymer, and may be transparently or translucently formed. According to an embodiment, the first transparent member 421*a* may be disposed to face a left eye of the user in a fourth direction ④, and the second transparent member 421*b* may be disposed to face a right eye of the user in a third direction ③. According to various embodiments, when the display 421 is transparent, the display 421 may be disposed at a position facing the eyes of the user to form a display region.

According to an embodiment, the display 421 may include a lens including a transparent waveguide. The lens may serve to adjust the focus such that a screen (e.g., an XR content image) output to the display 421 is to be viewed by the eyes of the user. For example, light emitted from a display panel may pass through the lens and be transmitted to the user through the waveguide formed within the lens. The lens may include, for example, a Fresnel lens, a pancake lens, or a multichannel lens.

An optical waveguide (e.g., a waveguide) may serve to transmit a light source generated by the display 421 to the eyes of the user. The optical waveguide may be formed of glass, plastic, or a polymer, and may have a nanopattern formed on a portion of an inner or outer surface, for example, a grating structure of a polygonal or curved shape. According to an embodiment, light incident to one end of the optical waveguide, that is, an output image of the display 421 may be propagated inside the optical waveguide to be provided to the user. In addition, the optical waveguide formed of a free-form prism may provide the incident light to the user through a reflection mirror. The optical waveguide may include at least one of diffraction elements (e.g., a DOE and a HOE) or at least one of reflective elements (e.g., a reflection mirror). The optical waveguide may guide an image output from the display 421 to the eyes of the user using the at least one diffractive element or reflective element included in the optical waveguide.

According to an embodiment, the diffractive element may include an input optical member/output optical member (not shown). For example, the input optical member may refer to an input grating region, and the output optical member (not shown) may refer to an output grating region. The input grating region may serve as an input end that diffracts (or reflects) light output from a light source (e.g., a micro-LED) to transmit the light to a transparent member (e.g., the first transparent member 421a and the second transparent member 421b) of the display region. The output grating region may serve as an outlet that diffracts (or reflects) the light transmitted to the transparent member (e.g., the first transparent member and the second transparent member) of the optical waveguide to the eyes of the user.

According to an embodiment, the reflective element may include a TIR optical element or a TIR waveguide for TIR. For example, TIR, which is a scheme for guiding light, may generate an angle of incidence such that light (e.g., a virtual image) input through the input grating region is to be reflected substantially 100% from one surface (e.g., a specific side) of the optical waveguide and the light is to be transmitted substantially 100% up to the output grating region.

In an embodiment, the light emitted from the display 421 may be guided to an optical path to the waveguide through the input optical member. The light traveling inside the optical waveguide may be guided toward the eyes of the user through the output optical member. The display region may be determined based on the light emitted in the direction of the eyes.

According to an embodiment, the electronic device 401 may include a plurality of cameras. For example, the cameras may include the first function camera 415 (e.g., a recognition camera) disposed in the second direction ② of the main body 410, the second function cameras 411 and 412 (e.g., image capturing cameras) disposed in the second direction ②, the third function camera 428 (e.g., an ET camera) disposed in the first direction ①, and the fourth function cameras 425 and 426 (e.g., face recognition cameras) disposed in the first direction ①, and may further include other function cameras (not shown).

The first function camera 415 (e.g., the recognition camera) may be used for a function of detecting a movement of the user or recognizing a gesture of the user. The first function camera 415 may support at least one of head tracking, hand detection and hand tracking, and space recognition. For example, the first function camera 415 may mainly use, for example, a GS camera having excellent performance compared to an RS camera to detect and track fine gestures or movements of hands and fingers, and may be configured as a stereo camera including two or more GS cameras for head tracking and space recognition. The first function camera 415 may perform functions, such as, 6 DoF space recognition, and a SLAM function for recognizing information (e.g., position and/or direction) associated with a surrounding space through depth imaging.

The second function cameras 411 and 412 (e.g., the image capturing cameras) may be used to capture images of the outside, generate an image or video corresponding to the outside, and transmit it to a processor (e.g., the processor 120 of FIG. 1). The processor may display the image provided from the second function cameras 411 and 412 on the display 421. The second function cameras 411 and 412 may also be referred to, for example, as an HR or PV camera and may include an HR camera. For example, the second function cameras 411 and 412 may be color cameras equipped with a function for obtaining high-quality images, such as, an AF function and OIS, but are not limited thereto. The second function cameras 411 and 412 may also include a GS camera or an RS camera.

The third function camera 428 (e.g., the ET camera) may be disposed on the display 421 (or inside the main body) such that camera lenses face the eyes of the user when the user wears the electronic device 401. The third function camera 428 may be used for detecting and tracking the pupils (e.g., ET). The processor may verify a gaze direction by tracking movements of the left eye and the right eye of the user in an image received from the third function camera 428. By tracking positions of the pupils in the image, the processor may be configured such that the center of an XR content image displayed on the display region is positioned according to a direction in which the pupils are gazing. For example, the third function camera 428 may use a GS camera to detect the pupils and track the movements of the pupils. The third function camera 428 may be installed for each of the left eye and the right eye, and may have the same camera performance and specifications.

The fourth function cameras 425 and 426 (e.g., the face recognition cameras) may be used to detect and track a facial expression of the user (e.g., FT) when the user wears the electronic device 401.

According to an embodiment, the electronic device 401 may include a lighting unit (e.g., LED) (not shown) as an auxiliary light for cameras. For example, the third camera 425 may use a lighting unit included in a display as an auxiliary light for facilitating gaze detection when tracking eye movements, to direct emitted light (e.g., IR LED of an IR wavelength) toward both eyes of the user. In an example, the second function cameras 411 and 412 may further include a lighting unit (e.g., a flash) as an auxiliary light for supplementing surrounding brightness when capturing an image of the outside.

According to an embodiment, the depth sensor 417 (or a depth camera) may be used to verify a distance to an object (e.g., a target) through, for example, TOF. TOF, which is a technology for measuring a distance to an object using a signal (e.g., near-infrared rays, ultrasound, or laser), may transmit a signal from a transmitter and then measure the signal by a receiver, and may measure a distance to an object based on a TOF of the signal.

According to an embodiment, the touch sensor 413 may be disposed in the second direction ② of the main body 410. For example, when the user wears the electronic device 401, the eyes of the user may view in the first direction ① of the main body. The touch sensor 413 may be implemented as a single type or a left/right separated type based on the shape of the main body 410 but is not limited thereto. For example, in a case in which the touch sensor 413 is implemented as a left/right separated type as shown in FIG. 4A, when the user wears the electronic device 401, a first touch sensor 413a may be disposed at a position corresponding to the left eye of the user in the fourth direction ④, and a second touch sensor 413b may be disposed at a position corresponding to the right eye of the user in the third direction ③.

The touch sensor 413 may recognize a touch input using at least one of, for example, a capacitive, a resistive, an infrared, or an ultrasonic method. For example, a touch sensor 413 using the capacitive method may recognize a physical touch (or contact) input or hovering (or proximity) input of an external object. According to various embodiments, the electronic device 401 may use a proximity sensor (not shown) to recognize proximity to an external object.

According to an embodiment, the touch sensor 413 may have a two-dimensional (2D) surface and transmit, to a processor (e.g., the processor 120 of FIG. 1), touch data (e.g., touch coordinates) of an external object (e.g., a finger of the user) contacting the touch sensor 413. The touch sensor 413 may detect a hovering input of an external object (e.g., a finger of the user) approaching within a first distance away from the touch sensor 413 or detect a touch input contacting the touch sensor 413.

In an embodiment, touch sensor 413 may provide two-dimensional information about the contact point to processor 120 as "touch data" when an external object touches touch sensor 413. The touch data may be described as a "touch mode." When the external object is positioned within the first distance from the touch sensor 413 (or hovers above a proximity or touch sensor), the touch sensor 413 may provide hovering data about a time point or position of the external object hovering around the touch sensor 413 to the processor 120. The hovering data may also be described as a "hovering mode/proximity mode."

According to an embodiment, the electronic device 401 may obtain the hovering data using at least one of the touch sensor 413, a proximity sensor (not shown), or/and the depth sensor 417 to generate information about a distance between the touch sensor 413 and an external object, a position, or a time point.

According to an embodiment, the main body 410 may include a processor (e.g., the processor 120 of FIG. 1) and a memory (e.g., the memory 130 of FIG. 1) therein.

The memory 130 may store various instructions that may be executed by the processor. The instructions may include control instructions, such as arithmetic and logical operations, data movement, or input/output, which may be recognized by the processor. The memory may include a volatile memory (e.g., the volatile memory 132 of FIG. 1) and a non-volatile memory (e.g., the non-volatile memory 134 of FIG. 1) to store, temporarily or permanently, various pieces of data.

The processor may be operatively, functionally, and/or electrically connected to each of the components of the electronic device 401 to perform control and/or communication-related computation or data processing of each of the components. The operations performed by the processor may be stored in the memory and, when executed, may be executed by the instructions that cause the processor to operate.

Although there is no limitation to the computation and data processing functions implemented by the processor on the electronic device 401, a series of operations related to an XR content service function will be described hereinafter. The operations of the processor to be described below may be performed, for example, by executing the instructions stored in the memory.

According to an embodiment, the processor may generate a virtual object based on virtual information based on image information. The processor may output a virtual object related to an XR service along with background spatial information through the display 421. For example, the processor may obtain image information by capturing an image related to a real space corresponding to an FoV of the user wearing the electronic device 401 through the second function cameras 411 and 412, or generate a virtual space of a virtual environment. For example, the processor may perform control to display, on the display 421, XR content (hereinafter, referred to as an XR content screen) that outputs at least one virtual object such that it is visible overlapping in a FoV area or an area determined as the FoV of the user.

According to an embodiment, the electronic device 401 may have a form factor to be worn on the head of the user. The electronic device 401 may further include a strap and/or a wearing member to be fixed on a body part of the user. The electronic device 401 may provide a VR, AR, and/or MR-based user experience while worn on the head of the user.

Figure 5:
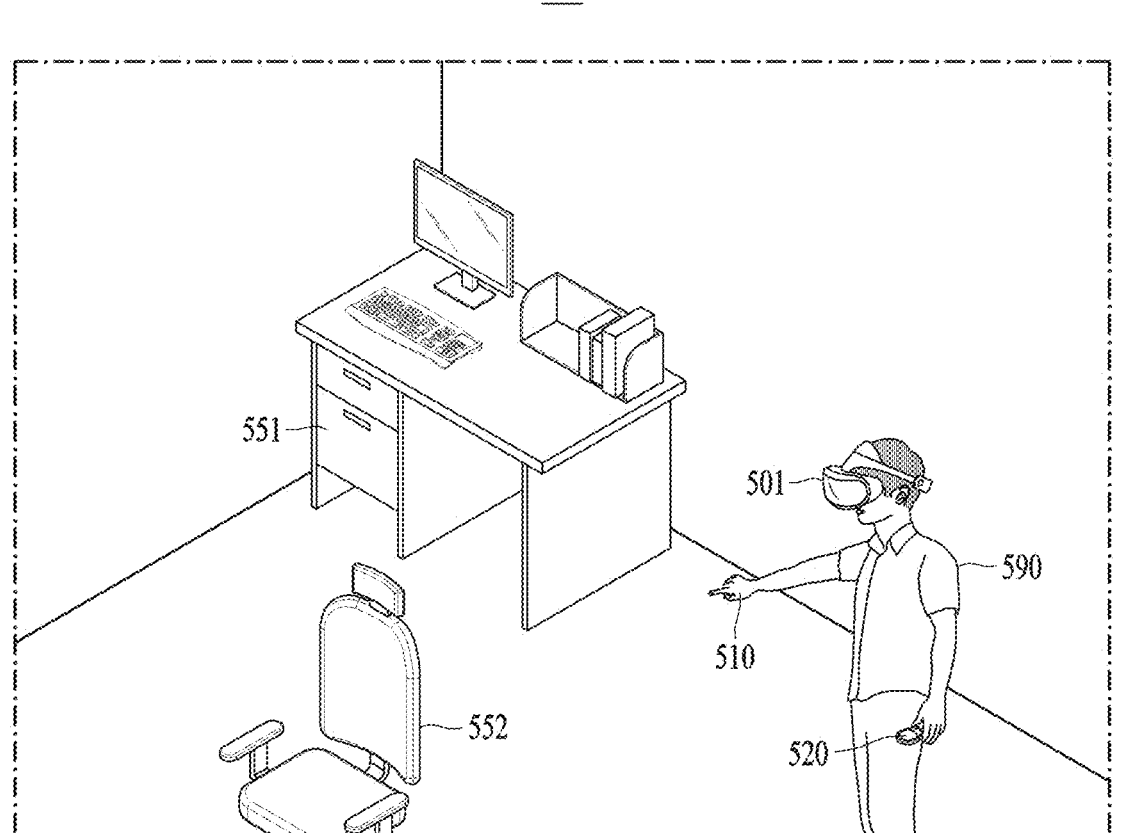
FIG. 5 is a diagram illustrating an example of construction of a virtual space and input from and output to a user in a virtual space according to various embodiments.

FIG. 5 is a diagram illustrating an example of construction of a virtual space and input from and output to a user in a virtual space according to various embodiments.

An electronic device 501 (e.g., the electronic device 101 of FIG. 1, the electronic device 201 of FIG. 2, the electronic device 301 of FIG. 3, or the electronic device 401 of FIGS. 4A and 4B) may obtain spatial information about a physical space in which objects are located using the sensors. The spatial information may include a geographic location of the physical space in which the objects are located, a size of the space, an appearance of the space, a position of a physical object 551 disposed in the space, a size of the physical object 551, an appearance of the physical object 551, and illumination information. The appearance of the space and the physical object 551 may include at least one of a shape, a texture, or a color of the space and the physical object 551. The illuminance information, which is, for example, information about a light source that emits light acting in the physical space, may include at least one of an intensity, a direction, or a color of illumination. The sensors described above may collect information for providing AR. For example, in an AR device shown in FIGS. 2, 3, 4A, and 4B, the sensors may include a camera and a depth sensor. However, the sensors are not limited thereto, and the sensors may further include at least one of an infrared sensor, a depth sensor (e.g., a light detection and ranging (lidar) sensor, a radio detection and ranging (radar) sensor, or a stereo camera), a gyro sensor, an acceleration sensor, or a geomagnetic sensor.

The electronic device 501 may collect the spatial information over a plurality of time frames. For example, in each time frame, the electronic device 501 may collect information about a space of a portion belonging to a scene within a sensing range (e.g., a FoV) of a sensor at a position of the electronic device 501 in the physical space. The electronic device 501 may analyze the spatial information of the time frames to track a change (e.g., a position movement or state change) of an object over time. The electronic device 501 may integrally analyze the spatial information collected through the plurality of sensors to obtain integrated spatial information (e.g., an image obtained by spatially stitching scenes around the electronic device 501 in the physical space) of an integrated sensing range of the plurality of sensors.

The electronic device 501 may analyze the physical space as three-dimensional (3D) information, using various input signals (e.g., sensing data of an RGB camera, an infrared sensor, a depth sensor, or a stereo camera) of the sensors. For example, the electronic device 501 may analyze at least one of the shape, the size, or the position of the physical space, and the shape, the size, or the position of the physical object 551.

For example, the electronic device 501 may detect an object captured in a scene corresponding to an FoV of a camera, using sensing data (e.g., a captured image) of the camera. The electronic device 501 may determine a label of the physical object 551 (e.g., as information indicating classification of an object, including values indicating a chair, a monitor, or a plant) from a 2D scene image of the camera and an area (e.g., a bounding box) occupied by the physical object 551 in the 2D scene. Accordingly, the electronic device 501 may obtain 2D scene information from a position at which a user 590 is viewing. In addition, the electronic device 501 may also calculate a position of the electronic device 501 in the physical space based on the sensing data of the camera.

The electronic device 501 may obtain position information of the user 590 and depth information of a real space in a viewing direction, using sensing data (e.g., depth data) of a depth sensor. The depth information, which is information indicating a distance from the depth sensor to each point, may be expressed in the form of a depth map. The electronic device 501 may analyze a distance in the unit of each pixel at a 3D position at which the user 590 is viewing.

The electronic device 501 may obtain information including a 3D point cloud and mesh using various pieces of sensing data. The electronic device 501 may obtain a plane, a mesh, or a 3D coordinate point cluster that configures the space by analyzing the physical space. The electronic device 501 may obtain a 3D point cloud representing physical objects based on the information obtained as described above.

The electronic device 501 may obtain information including at least one of 3D position coordinates, 3D shapes, or 3D sizes (e.g., 3D bounding boxes) of the physical objects arranged in the physical space by analyzing the physical space.

Accordingly, the electronic device 501 may obtain physical object information detected in the 3D space and semantic segmentation information about the 3D space. The physical object information may include at least one of a position, an appearance (e.g., a shape, texture, and color), or a size of the physical object 551 in the 3D space. The semantic segmentation information, which is information obtained by semantically segmenting the 3D space into subspaces, may include, for example, information indicating that the 3D space is segmented into an object and a background and information indicating that the background is segmented into a wall, a floor, and a ceiling. As described above, the electronic device 501 may obtain and store 3D information (e.g., spatial information) about the physical object 551 and the physical space. The electronic device 501 may store 3D position information of the user 590 in the space, along with the spatial information.

The electronic device 501 may construct a virtual space 500 based on the physical positions of the electronic device 501 and/or the user 590. The electronic device 501 may generate the virtual space 500 by referring to the spatial information described above. The electronic device 501 may generate the virtual space 500 of substantially the same scale as the physical space based on the spatial information and arrange objects in the generated virtual space 500. The electronic device 501 may provide a complete VR to the user 590 by outputting an image that substitutes the entire physical space. The electronic device 501 may provide MR or AR by outputting an image that substitutes a portion of the physical space. Although the construction of the virtual space 500 based on the spatial information obtained by the analysis of the physical space has been described, the electronic device 501 may also construct the virtual space 500 irrespective of the physical position of the user 590. The virtual space 500 described herein may be a space corresponding to AR or VR and may also be referred to as a metaverse space.

For example, the electronic device 501 may provide a virtual graphic representation that substitutes at least a partial space of the physical space. The electronic device 501, which is an OST-based electronic device, may output the virtual graphic representation overlaid on a screen area corresponding to at least a partial space of a screen display portion. The electronic device 501, which is a VST-based electronic device, may output an image generated by substituting an image area corresponding to at least a partial space in a space image corresponding to a physical space rendered based on the spatial information with a virtual graphic representation. The electronic device 501 may substitute at least a portion of a background in the physical space with a virtual graphic representation, but embodiments are not limited thereto. The electronic device 501 may only additionally arrange a virtual object 552 in the virtual space 500 based on the spatial information, without changing the background.

The electronic device 501 may arrange and output the virtual object 552 in the virtual space 500. The electronic device 501 may set a manipulation area for the virtual object 552 in a space occupied by the virtual object 552 (e.g., a volume corresponding to an appearance of the virtual object 552). The manipulation area may be an area in which a manipulation of the virtual object 552 occurs. In addition, the electronic device 501 may substitute the physical object 551 with the virtual object 552 and output the virtual object 552. The virtual object 552 corresponding to the physical object 551 may have the same or similar shape as or to the corresponding physical object 551. However, embodiments are not limited thereto, and the electronic device 501 may set only the manipulation area in a space occupied by the physical object 551 or at a position corresponding to the physical object 551, without outputting the virtual object 552 that substitutes the physical object 551. That is, the electronic device 501 may transmit, to the user 590, visual information representing the physical object 551 (e.g., light reflected from the physical object 551 or an image obtained by capturing the physical object 551) as it is without a change, and set the manipulation area in the corresponding physical object 551. The manipulation area may be set to have the same shape and volume as the space occupied by the virtual object 552 or the physical object 551, but is not limited thereto. The electronic device 501 may set the manipulation area that is smaller than the space occupied by the virtual object 552 or the space occupied by the physical object 551.

According to an example embodiment, the electronic device 501 may arrange a virtual object (not shown) (e.g., an avatar object) representing the user 590 in the virtual space 500. When the avatar object is provided in a first-person view, the electronic device 501 may provide a visualized graphic representation corresponding to a portion of the avatar object (e.g., a hand, a torso, or a leg) to the user 590 via the display described above (e.g., an OST display or a VST display). However, embodiments are not limited thereto, and when the avatar object is provided in a third-person view, the electronic device 501 may provide a visualized graphic representation corresponding to an entire shape (e.g., a back view) of the avatar object to the user 590 via the display described above. The electronic device 501 may provide the user 590 with an experience integrated with the avatar object.

In addition, the electronic device 501 may provide, to the user 590, the experience integrated with the avatar object using an avatar object of another user who enters the same virtual space 500. The electronic device 501 may receive feedback information that is the same as or similar to feedback information (e.g., information based on at least one of visual sensation, auditory sensation, or tactile sensation) provided to another electronic device 501 entering the same virtual space 500. For example, when an object is arranged in a certain virtual space 500 and a plurality of users access the virtual space 500, respective electronic devices 501 of the plurality of users 590 may receive feedback information (e.g., a graphic representation, a sound signal, or haptic feedback) of the same object arranged in the virtual space 500 and provide the feedback information to each user 590.

The electronic device 501 may detect an input to an avatar object of another electronic device 501 and may receive feedback information from the avatar object of the other electronic device 501. An exchange of inputs and feedback for each virtual space 500 may be performed by a server (e.g., the server 108 of FIG. 1). For example, the server (e.g., a server providing a metaverse space) may transfer, to the users 590, inputs and feedback between the avatar object of the user 590 and an avatar object of another user 590. However, embodiments are not limited thereto, and the electronic device 501 may establish direct communication with another electronic device 501 to provide an input based on an avatar object or receive feedback, not via the server.

For example, based on detecting a user input that selects a manipulation area, the electronic device 501 may determine that the physical object 551 corresponding to the selected manipulation area is selected by the user 590. An input of the user 590 may include at least one of a gesture input made using a body part (e.g., a hand or eye), a motion input, an input made using a separate VR accessory device, a voice input of the user, or a multi-modal input.

The gesture input may be, for example, an input corresponding to a gesture identified by tracking a body part 510 of the user 590 and may include, for example, an input indicating or selecting an object. The gesture input may include, for example, at least one of a gesture by which a body part (e.g., a hand) moves toward an object for a predetermined period of time or more, a gesture by which a body part (e.g., a finger, an eye, or a head) points at an object, or a gesture by which a body part and an object contact each other spatially. A gesture of pointing at an object with an eye may be identified based on ET. A gesture of pointing at an object with a head may be identified based on head tracking.

Tracking the body part 510 of the user 590 may be mainly performed based on a camera of the electronic device 501 but is not limited thereto. The electronic device 501 may track the body part 510 based on a cooperation of sensing data of a vision sensor (e.g., image data of a camera and depth data of a depth sensor) and information collected by accessory devices to be described below (e.g., controller tracking or finger tracking in a controller). Finger tracking may be performed by sensing a distance or contact between an individual finger and the controller based on a sensor (e.g., an infrared sensor) embedded in the controller.

VR accessory devices may include, for example, a ride-on device, a wearable device, a controller device 520, or other sensor-based devices. The ride-on device, which is a device operated by the user 590 riding thereon, may include, for example, at least one of a treadmill-type device or a chair-type device. The wearable device, which is a manipulation device worn on at least a part of the body of the user 590, may include, for example, at least one of a full body suit-type or a half body suit-type controller, a vest-type controller, a shoe-type controller, a bag-type controller, a glove-type controller (e.g., a haptic glove), or a face mask-type controller. The controller device 520 may include an input device (e.g., a stick-type controller or a firearm) manipulated by a hand, foot, toe, or other body parts 510.

The electronic device 501 may establish direct communication with an accessory device and track at least one of a position or motion of the accessory device, but embodiments are not limited thereto. The electronic device 501 may communicate with the accessory device via a base station for VR.

For example, the electronic device 501 may determine that the virtual object 552 is selected, based on detecting an act of gazing at the virtual object 552 for a predetermined period of time or more through an eye gaze tracking technology described above. In an example, the electronic device 501 may recognize a gesture of pointing at the virtual object 552 through a hand tracking technology. The electronic device 501 may determine that the virtual object 552 is selected, based on a direction in which a tracked hand points indicating the virtual object 552 for a predetermined period of time or more or that a hand of the user 590 contacts or enters an area occupied by the virtual object 552 in the virtual space 500.

The voice input of the user, which is an input corresponding to a user's voice obtained by the electronic device 501, may be sensed by, for example, an input module (e.g., a microphone) (e.g., the input module 150 of FIG. 1) of the electronic device 501 or may include voice data received from an external electronic device of the electronic device 501. By analyzing the voice input of the user, the electronic device 501 may determine that the physical object 551 or the virtual object 552 is selected. For example, based on detecting a keyword indicating at least one of the physical object 551 or the virtual object 552 from the voice input of the user, the electronic device 501 may determine that at least one of the physical object 551 or the virtual object 552 corresponding to the detected keyword is selected.

The electronic device 501 may provide feedback to be described below as a response to the input of the user 590 described above.

The feedback may include visual feedback, auditory feedback, tactile feedback, olfactory feedback, and/or gustatory feedback. The feedback may be rendered by the server 108, the electronic device 101, and/or the external electronic device 102 as described above with reference to FIG. 1.

The visual feedback may include an operation of outputting an image through the display (e.g., a transparent display or an opaque display) of the electronic device 501.

The auditory feedback may include an operation of outputting a sound through a speaker of the electronic device 501.

The tactile feedback may include force feedback that simulates a weight, a shape, a texture, a dimension, and dynamics. For example, the haptic glove may include a haptic element (e.g., an electric muscle) that simulates a sense of touch by tensing and relaxing the body of the user 590. The haptic element in the haptic glove may act as a tendon. The haptic glove may provide haptic feedback to the entire hand of the user 590. The electronic device 501 may provide feedback that represents a shape, a size, and stiffness of an object through the haptic glove. For example, the haptic glove may generate a force that simulates a shape, a size, and stiffness of an object. The exoskeleton of the haptic glove (or a suit-type device) may include a sensor and a finger motion measurement device, may transfer a cable-pulling force (e.g., an electromagnetic, direct current (DC) motor-based, or pneumatic force) to fingers of the user 590, and may thereby transmit tactile information to the body. Hardware that provides such tactile feedback may include a sensor, an actuator, a power source, and a wireless transmission circuit. The haptic glove may operate by inflating and deflating an inflatable air bladder on a surface of the glove.

Based on an object in the virtual space 500 being selected, the electronic device 501 may provide feedback to the user 590. For example, the electronic device 501 may output a graphic representation (e.g., a representation of highlighting the selected object) indicating the selected object through the display. For example, the electronic device 501 may output a sound (e.g., a voice) notifying the selected object through a speaker. For example, the electronic device 501 may transmit an electrical signal to a haptic supporting accessory device (e.g., the haptic glove) and may thereby provide a haptic motion that simulates a tactile sensation of a corresponding object to the user 590.

Figure 6A:
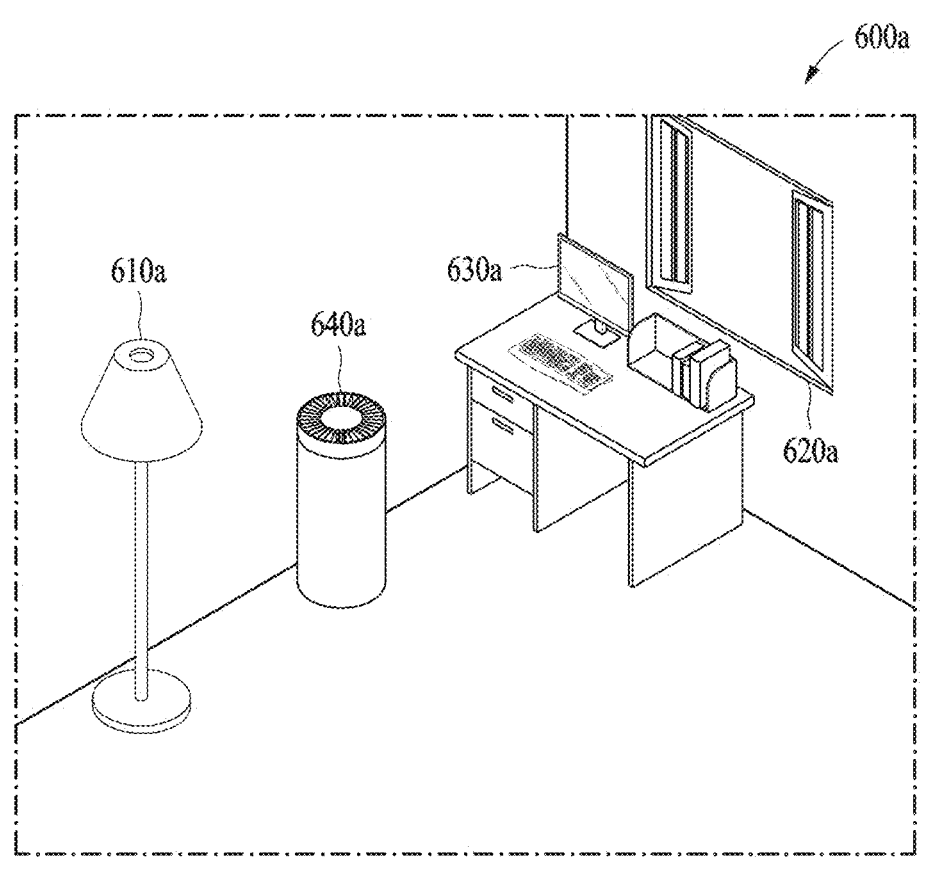
FIGS. 6A and 6B are diagrams illustrating an example operation of outputting first feedback and second feedback based on an object detected in a display region by an electronic device according to various embodiments.
Figure 6B:
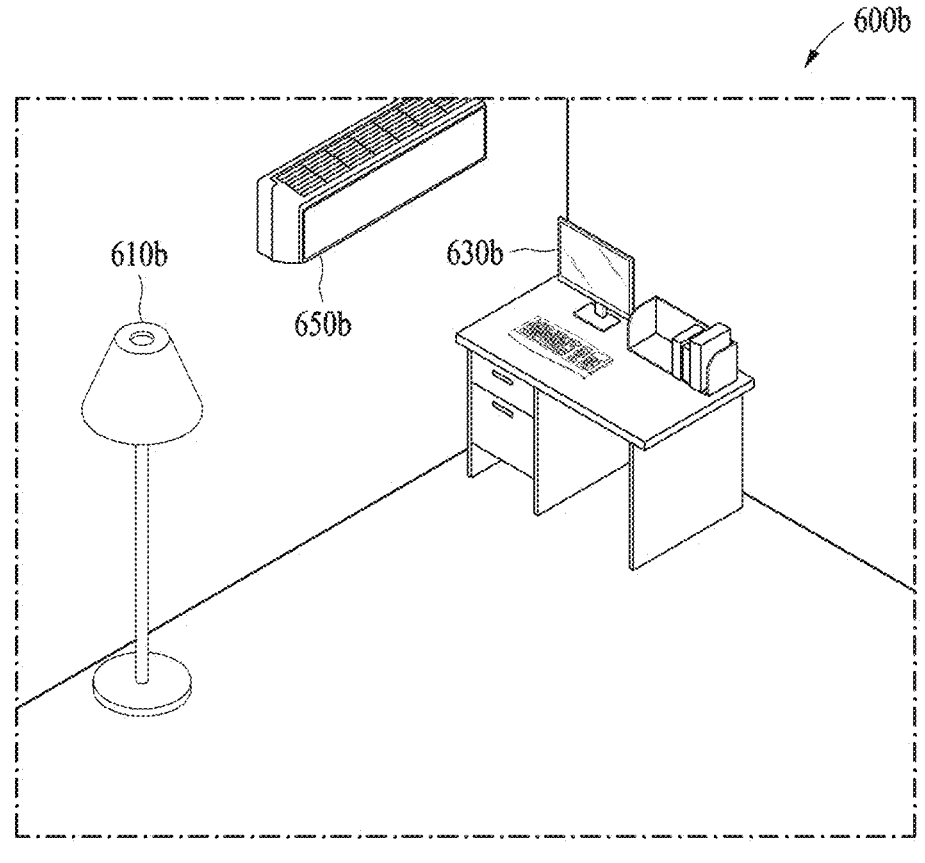
Figure 6B:

FIGS. 6A and 6B are diagrams illustrating an example operation of outputting first feedback and second feedback based on an object detected in a display region by an electronic device according to various embodiments.

An electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) may be worn on the user.

The electronic device may display a display region (e.g., a first display region 600a of FIG. 6A or a second display region 600b of FIG. 6B). The display region may refer to, for example, a region that is displayed through a display of the electronic device. According to an embodiment, the display region may include a region that is determined as a FoV of the user. The electronic device may determine, as the display region, a region that is determined as the FoV of the user in an image obtained through an image capturing camera (e.g., the third camera 245 of FIG. 2 or the second function cameras 411 and 412 of FIGS. 4A and 4B), and display the determined display region through the display.

The electronic device may obtain an input from the user. An input may include at least one of a voice input, a gesture input, a motion input, a multi-modal input, or an input made using a separate VR accessory device. For example, referring to FIGS. 6A and 6B, the electronic device may obtain a voice input, "How's the weather today?".

The electronic device may generate, based on obtaining the input of the user, first feedback 661a and 661b to the input. As will be described below in more detail with reference to FIG. 7, the electronic device may discern an intent of the user by analyzing the voice input of the user, and generate and/or output feedback based on the intent.

The first feedback 661a and 661b may include feedback generated based on the input of the user. According to an embodiment, the first feedback 661a and 661b may be generated independently of an object detected in a display region, a surrounding physical space, and/or a virtual space. The first feedback 661a and 661b may be generated identically, even if an object detected in the first display region 600a is different from an object detected in the second display region 600b. For example, the first feedback 661a and 661b may be generated identically in each of the first display region 600a, in which an air purifier 640a is detected, and the second display region 600b, in which an air conditioner 650b is detected. For example, referring to FIGS. 6A and 6B, the electronic device may generate the first feedback 661a and 661b, "The highest temperature of today will be 30 degrees and the lowest temperature will be 20 degrees. It will be cloudy all day."

The electronic device may detect an object in at least one of a display region, a surrounding physical space, or a virtual space. The object may include a physical object and/or a virtual object. For example, referring to FIG. 6A, the electronic device may detect a floor lamp 610a, a window 620a, a monitor 630a, and the air purifier 640a in the first display region 600a. Referring to FIG. 6B, the electronic device may detect a floor lamp 610b, a monitor 630b, and the air conditioner 650b in the second display region 600b.

For example, the electronic device may detect objects in the display region by analyzing an image of a display region obtained through a vision sensor (e.g., a vision sensor including an image capturing camera).

For example, the electronic device may detect objects in the surrounding physical space by analyzing a captured image of the surrounding physical space. The captured image of the surrounding physical space may include an image of a region other than the display region. For example, the surrounding physical space may be obtained by a rear-view camera that captures an image of a user's rearview. In an example, the electronic device may detect an object that has established communication with the electronic device. The electronic device may detect, based on the establishment of communication with the object, the corresponding object, although at least a portion of the object detected in the surrounding physical space is not visible in the display region (or the captured image of the surrounding physical space). In an example, the electronic device may identify the surrounding physical space based on the captured image of the surrounding physical space, and detect objects registered in the identified space. For example, the electronic device may store space-specific object registration data including information in which objects corresponding to a space are registered in each of a first space (e.g., kitchen), a second space (e.g., living room), and a third space (e.g., dressing room). Based on identifying the surrounding physical space as one (e.g., kitchen) of the plurality of spaces, the electronic device may detect objects (e.g., a refrigerator, dishwasher, oven, microwave, and air fryer) registered in the identified space. The electronic device may detect both objects displayed in the display region and objects not displayed in the display region among the objects registered in the surrounding physical space. Even when an object registered in the surrounding physical space is not displayed in the display region of the electronic device, the electronic device may detect the object registered in the surrounding physical space.

For example, the electronic device may detect, based on a virtual space where the user enters, an object registered in the virtual space. For example, the electronic device may detect a virtual object included in the virtual space where the user enters.

The electronic device may generate second feedback 662a-1, 662a-2 and 662b. The second feedback 662a-1, 662a-2 and 662b may follow the first feedback 661a and 661b. The second feedback 662a-1, 662a-2 and 662b may be generated based on objects detected in at least one of the display region, the surrounding physical space, or the virtual space. For example, the second feedback 662a-1, 662a-2 and 662b may include at least one of feedback of suggesting a control command for a detected object to the user, feedback of displaying an interface for obtaining the control command for the detected object, feedback of suggesting an action of the user for the detected object, feedback of providing a preview of the control command and/or the action for the detected object, or feedback of providing additional information for the object.

According to an embodiment, the second feedback 662a-1, 662a-2 and 662b may be generated differently when the objects detected in the first display region 600a are different from the objects detected in the second display region 600b. For example, the second feedback 662a-1, 662a-2 and 662b may be generated differently in each of the first display region 600*a*, in which an air purifier is detected, and the second display region 600*b*, in which an air conditioner is detected.

For example, in FIG. 6A, based on detecting the air purifier 640*a* in the first display region 600*a*, the electronic device may generate the second feedback 662*a*-1, "The air quality is bad today. How about turning on the air purifier that is turned off?" Based on detecting the window 620*a* in the first display region 600*a*, the electronic device may generate the second feedback 662*a*-2, "The air quality is bad but the window is open. You can close the window." In FIG. 6B, based on detecting the air conditioner in the second display region 600*b*, the electronic device may generate the second feedback 662*b*, "Today is hotter than yesterday. How about turning the air conditioner on?"

The electronic device may output the first feedback 661*a* and 661*b*, and the second feedback 662*a*-1, 662*a*-2 and 662*b*. The electronic device may provide the second feedback 662*a*-1, 662*a*-2 and 662*b* (e.g., additional feedback) generated based on the detected object along with the first feedback 661*a* and 661*b* based on the input of the user, thereby providing customized feedback based on an object visible to the user and/or an object located in the vicinity of the user.

Figure 7:
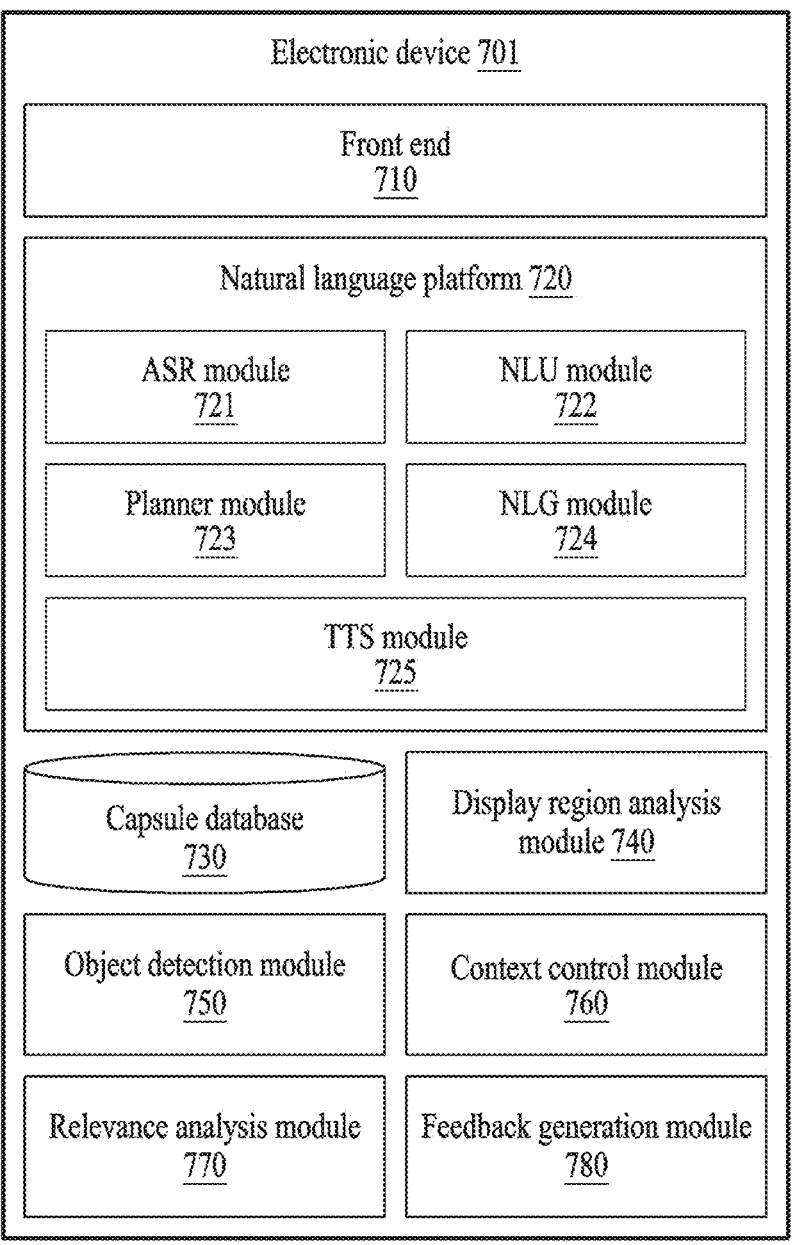
FIG. 7 is a diagram illustrating a configuration of example an electronic device according to various embodiments.

FIG. 7 is a diagram illustrating a configuration of an example electronic device according to various embodiments.

An electronic device 701 (e.g., the electronic device 101 of FIG. 1, the electronic device 201 of FIG. 2, the electronic device 301 of FIG. 3, the electronic device 401 of FIGS. 4A and 4B, or the electronic device 501 of FIG. 5) according to an embodiment may analyze an input of the user, and generate first feedback based on the input of the user and second feedback based on a detected object.

The electronic device 701 may include at least one of a front end 710, a natural language platform 720, a capsule database (DB) 730, a display region analysis module 740, an object detection module 750, a context control module 760, a relevance analysis module 770, or a feedback generation module 780.

The front end 710 may receive an input (e.g., a voice input) from the user. The front end 710 may transmit a response to the input.

According to an embodiment, the natural language platform 720 may include at least one of an automatic speech recognition (ASR) module 721, a natural language understanding (NLU) module 722, a planner module 723, a natural language generator (NLG) module 724, or a text-to-speech (TTS) module 725.

The ASR module 721 may convert the voice input of the user into text data. The NLU module 722 may discern an intent of the user using the text data of the voice input. For example, the NLU module 722 may discern the intent of the user by performing syntactic analysis or semantic analysis. The NLU module 722 may discern the meaning of a word extracted from the voice input using a linguistic feature (e.g., a grammatical element) of a morpheme or phrase, and determine the intent of the user by matching the discerned meaning of the word to an intent.

The planner module 723 may generate a plan using a parameter and the intent determined by the NLU module 722. According to an embodiment, the planner module 723 may determine a plurality of domains required to perform a task based on the determined intent. The planner module 723 may determine a plurality of actions included in each of the plurality of domains determined based on the intent. According to an embodiment, the planner module 723 may determine a parameter required to execute the determined plurality of actions, or a result value output by the execution of the plurality of actions. The parameter and the result value may be defined as a concept of a designated form (or class). Accordingly, the plan may include a plurality of actions and a plurality of concepts determined by the intent of the user. The planner module 723 may determine relationships between the plurality of actions and the plurality of concepts stepwise (or hierarchically). For example, the planner module 723 may determine an execution order of the plurality of actions determined based on the intent of the user, based on the plurality of concepts. In other words, the planner module 723 may determine the execution order of the plurality of actions based on the parameter required for the execution of the plurality of actions and results output by the execution of the plurality of actions. Accordingly, the planner module 723 may generate a plan including connection information (e.g., ontology) on connections between the plurality of actions and the plurality of concepts. The planner module 723 may generate the plan using information stored in the capsule DB 730 that stores a set of relationships between concepts and actions.

The NLG module 724 may change designated information into a text form. The information changed into the text form may be in the form of a natural language utterance. The TTS module 725 may change information in a text form into information in a speech form.

The capsule DB 730 may store information on relationships between the plurality of concepts and actions corresponding to the plurality of domains. A capsule according to an embodiment may include a plurality of action objects (or action information) and concept objects (or concept information) included in the plan. According to an embodiment, the capsule DB 730 may store a plurality of capsules in the form of a concept action network (CAN). According to an embodiment, the plurality of capsules may be stored in a function registry included in the capsule DB 730.

The capsule DB 730 may include a strategy registry that stores strategy information necessary for determining a plan corresponding to an input. The strategy information may include reference information for determining one plan when a plurality of plans corresponding to the input are present. According to an embodiment, the capsule DB 730 may include a follow-up registry that stores information on follow-up actions for suggesting a follow-up action to the user in a designated situation. The follow-up action may include, for example, a follow-up utterance. According to an embodiment, the capsule DB 730 may include a layout registry that stores layout information that is information output through the electronic device 701. According to an embodiment, the capsule DB 730 may include a vocabulary registry that stores vocabulary information included in capsule information. According to an embodiment, the capsule DB 730 may include a dialog registry that stores information on a dialog (or an interaction) with the user. The capsule DB 730 may update the stored objects through a developer tool. The developer tool may include, for example, a function editor for updating an action object or a concept object. The developer tool may include a vocabulary editor for updating a vocabulary. The developer tool may include a strategy editor for generating and recording a strategy for determining a plan. The developer tool may include a dialog editor for generating a dialog with a user. The developer tool may include a follow-up editor for activating a follow-up goal and editing a follow-up utterance that provides a hint. The follow-up goal may be determined based on a currently set goal, a preference of a user, or environmental conditions.

The display region analysis module 740 may determine a display region and/or a viewing region. The viewing region may refer to, for example, a partial region gazed by a user among a region that is determined by the FoV of the user (or the display region). According to an embodiment, the viewing region may be determined based on a gaze point corresponding to the gaze of the user. For example, the viewing region may be determined as a circular region with a radius that is determined based on the gaze point corresponding to the gaze of the user. In an example, the viewing region may be an internal region having an oval shape, a square shape, or a closed curve. However, the viewing region is not limited to being determined based on the gaze of the user. According to an embodiment, the electronic device 701 may determine a partial region that is determined based on the display region as the viewing region of the user.

For example, based on obtaining an input of the user by the electronic device 701, the display region analysis module 740 may determine a display region and/or a viewing region corresponding to a time point at which the input is obtained (or a period of time including the time point at which the input is obtained).

The object detection module 750 may detect objects in at least one of a display region, a surrounding physical space, or a virtual space. The object detection module 750 may detect objects in real time in at least one of the display region, the surrounding physical space, or the virtual space independently of the input of the user. According to an embodiment, the object detection module 750 may detect objects in real time independently of the input of the user, and detect objects in at least one of the surrounding physical space or the virtual space based on the input of the user.

The context control module 760 may determine to continue and/or terminate a context corresponding to the input of the user. The context corresponding to the input may include a period of time from a first time point, at which the input of the user is obtained, to a subsequent second time point. The context corresponding to the input may refer to, for example, a period of time in which the electronic device 701 provides feedback (e.g., first feedback and second feedback) generated based on the input. The context control module 760 may determine an end point of the context. The context control module 760 may determine to continue and/or terminate the context based on at least one of a subsequent input of the user, a length of time from the first time point, a space where the user is located, or a detected object.

The electronic device 701 may detect an object while the context corresponding to the input is continued from the time point, at which the input of the user is obtained, and terminate the detection of objects based on the termination of the context. As a result, the electronic device 701 may generate and/or output second feedback on the detected object while the context is continued. The electronic device 701 may not generate and/or output the second feedback on the detected object after the context is terminated. An operation of terminating the detection of objects according to the termination of the context will be described below in more detail with reference to FIG. 8.

The relevance analysis module 770 may analyze relevance between an input of the user and a detected object. According to an embodiment, the electronic device 701 may detect candidate objects, and generate second feedback on an object having high relevance with the input of the user among the detected candidate objects. For example, the relevance analysis module 770 may calculate a relevance score for the input of the user and each of the detected candidate objects.

The feedback generation module 780 may generate feedback including first feedback and second feedback. The first feedback may be generated based on an input of the user. The second feedback may be generated based on an input and a detected object.

According to an embodiment, the feedback generation module 780 may generate the second feedback based more on the relevance received from the relevance analysis module 770. For example, the feedback generation module 780 may generate the second feedback on an object based on the input, each object, and a relevance score between the input and the corresponding object. The feedback generation module 780 may generate the second feedback on the object based on the relevance score exceeding a threshold score, and may not generate the second feedback on the object based on the relevance score being less than or equal to the threshold score. As a result, the electronic device 701 may generate and/or output the second feedback on a candidate object having a relevance score exceeding the threshold. The electronic device 701 may not generate and/or output the second feedback on a candidate object having a relevance score that is less than or equal to the threshold.

Figure 8:
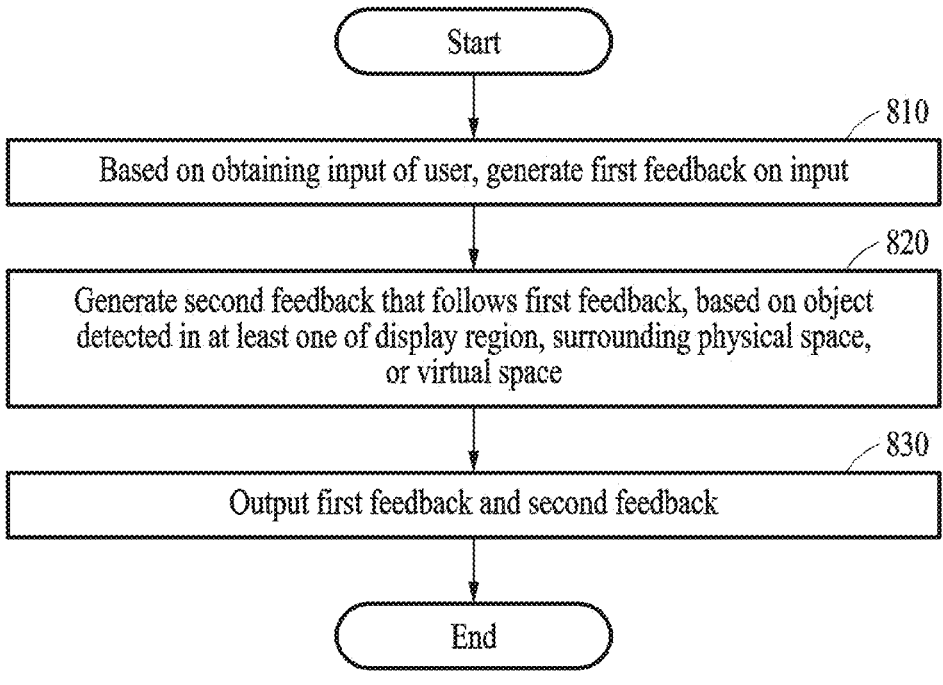
FIG. 8 is a flowchart illustrating an example operation of outputting feedback by an electronic device according to various embodiments.

FIG. 8 is a flowchart illustrating an example operation of outputting feedback by an electronic device according to various embodiments;

In the following embodiments, operations may be described as being performed sequentially, but these operations are not necessarily limited to being performed sequentially. For example, the order of the operations may be changed and/or at least two of the operations may be performed in parallel.

According to an embodiment, it may be understood that operations 810, 820, and 830 are performed by a processor (e.g., the processor 120 of FIG. 1) of an electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7).

In an example embodiment, the electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) may obtain an input of a user, and generate and output first feedback on the input of the user and second feedback on the input and a detected object.

In operation 810, according to an embodiment, based on obtaining the input of the user, the electronic device may generate the first feedback on the input.

The first feedback may refer to, for example, feedback generated based on the input of the user. The first feedback may be independent of an object detected in at least one of a display region, a surrounding physical space, or a virtual space. For example, if the input of user is the same, the first feedback may be the same although detected objects are different.

In operation 820, according to an embodiment, the electronic device may generate second feedback that follows the first feedback, based on an object detected in at least one of the display region, the surrounding physical space, or the virtual space.

The second feedback may refer to, for example, feedback generated based on the input of the user and a detected object. The second feedback may depend on an object detected in at least one of the display region, the surrounding physical space, or the virtual space.

According to an embodiment, the first feedback and the second feedback may each correspond to different sentences. However, embodiments are not limited thereto, and the first feedback and the second feedback may correspond to different parts of the same sentence. For example, the first feedback may be generated as a first part of a sentence and the second feedback may be generated as a second part of the sentence.

According to an embodiment, the electronic device may detect an object associated with the input. An object may include at least one of a physical object or a virtual object. For example, the electronic device may detect a candidate object in at least one of the display region, the surrounding physical space, or the virtual space. The electronic device may calculate a relevance score for the input and each candidate object. The electronic device may determine an object based on the calculated relevance score.

The relevance score may represent a relevance between the input and a corresponding candidate object. According to an embodiment, a relevance analysis module (e.g., the relevance analysis module 770 of FIG. 7) of the electronic device may calculate the relevance score between the input of the user and the candidate object by applying a relevance analysis model to input data. The input data may include information about the input of the user and information about the detected candidate object. The information about the input of the user may include at least one of an intent, domain, action, concept, or parameter determined based on the input of the user. The information about the candidate object may include at least one of an identifier of the candidate object or a category of the candidate object.

Based on the relevance score of the candidate object exceeding a threshold score, the electronic device may determine the candidate object as the object (e.g., the object associated with the input). Based on the relevance score of the candidate object being less than or equal to the threshold score, the electronic device may not determine the candidate object as the object. For example, based on the relevance score of the candidate object being less than or equal to the threshold score, the electronic device may determine the candidate object as an object not associated with the input.

According to an embodiment, the electronic device may calculate the relevance score based on a gaze of the user. For example, the electronic device may apply an additional point or weight to the relevance score for the candidate object based on a viewing region. For example, when at least a partial region of a first candidate object is included in the viewing region and an entire region corresponding to a second candidate object is not included in the viewing region, the electronic device may apply a larger value of the additional point or weight to a relevance score of the first candidate object than a relevance score of the second candidate object. In an example, when a partial region of the first candidate object included in the viewing region is larger than a partial region of the second candidate object included in the viewing region, the electronic device may apply a larger value of the additional point or weight to the relevance score of the first candidate object than the relevance score of the second candidate object.

In an example, the electronic device may apply the additional point or weight to the relevance score for the candidate object based on a distance from a gaze point to the candidate object. For example, when a first distance between the gaze point and the first candidate object (or a reference point of the first candidate object) is less than a second distance between the gaze point and the second candidate object (or a reference point of the second candidate object), the electronic device may apply a larger value of the additional point or weight to the relevance score of the first candidate object than the relevance score of the second candidate object.

The electronic device may detect an object based on a context corresponding to the input. For example, the electronic device may detect an object while the context corresponding to the input is continued from a time point at which the input is obtained. Based on the context corresponding to the input being terminated, the electronic device may stop detecting the object. The continuing and/or termination of the context corresponding to the input may be determined by a context control module (e.g., the context control module 760 of FIG. 7) of the electronic device. The context corresponding to the input may include a period of time for providing feedback on the input, after the time point at which the input is obtained. The continuing and/or termination of the context corresponding to the input may be determined based on at least one of a motion of a user, a subsequent input of the user, a length of time from a first time point, a space where the user is located, or a detected object.

According to an embodiment, the electronic device may determine whether to continue and/or terminate the context based on the space where the user is located. For example, the electronic device may determine a space where the user is located at the time point at which the input is obtained. The electronic device may determine that the context corresponding to the input is continued while the user is located in the determined space. The electronic device may detect the object in the display region, while the user is located in the determined space. Based on the user leaving the determined space, the electronic device may determine that the context corresponding to the input is terminated. Based on the user leaving the determined space, the electronic device may stop detecting the object.

According to an embodiment, the electronic device may determine whether to continue and/or terminate the context based on a motion of the user. For example, the electronic device may detect a motion of the user corresponding to the input. The motion of the user corresponding to the input may include, for example, a motion detected during a period of time including the time point at which the input is obtained. Based on detecting the motion of the user corresponding to the input, the electronic device may determine that the context corresponding to the input is continued. The electronic device may detect the object in the display region while detecting a motion. Based on detecting the termination of the motion of the user corresponding to the input, the electronic device may determine that the context corresponding to the input is terminated. Based on detecting the termination of the motion, the electronic device may stop detecting the object.

For example, when the user utters "How's the weather today?" while walking, the electronic device may obtain an input of the user while detecting user's steps. The electronic device may determine that the context corresponding to the input is continued while the walking is continued. The electronic device may detect the object while detecting the walking. Based on detecting the end of walking, the electronic device may determine that the context corresponding to the input is continued. Based on detecting the end of the walking, the electronic device may stop detecting the object.

According to an embodiment, the electronic device may determine whether to continue and/or terminate the context based on the detected object. The electronic device may detect an object associated with the input. Based on detecting the object associated with the input within a threshold time from the time point at which the input is obtained, the electronic device may determine that the context corresponding to the input is continued. When it fails to detect the object in at least one of the display region, the surrounding physical space, or the virtual space and/or when it is determined that all of the detected candidate objects are not associated with the input, the electronic device may fail to detect the object associated with the input. Based on failing to detect the object associated with the input within the threshold time from the time point at which the input is obtained, the electronic device may determine that the context corresponding to the input is terminated. Based on failing to detect the object associated with the input within the threshold time from the time point at which the input is obtained, the electronic device may stop detecting the object.

For example, when a voice input of a user, "How's the weather today?" is obtained, the electronic device may detect an air conditioner, an air purifier, a window, a flowerpot, and a pencil as candidate objects in at least one of the display region, the surrounding physical space, or the virtual space. When it is determined that the air conditioner, the air purifier, and the window are associated with the input among the candidate objects, the electronic device may determine that the context corresponding to the input is continued. As at least one of the display region, the surrounding physical space, or the virtual space changes according to a change (e.g., a motion of the user, a change of the surrounding physical space, or a change of the virtual space), the electronic device may detect candidate objects (e.g., wood, a pencil, and paper) again. When it is determined that all the detected candidate objects are not associated with the input, the electronic device may determine that the context corresponding to the input is terminated. Based on the context being terminated, the electronic device may stop detecting the object.

According to an embodiment, the electronic device may determine whether to continue and/or terminate the context based on a subsequent input of the user. For example, the electronic device may output first feedback based on an input and second feedback based on a detected object. The electronic device may obtain a subsequent input that follows the input. The electronic device may determine whether the subsequent input is associated with the object used to generate the second feedback. Based on the subsequent input being associated with the object used to generate the second feedback, the electronic device may determine that the context corresponding to the input is continued. Based on the subsequent input being not associated with the object used to generate the second feedback, the electronic device may determine that the context corresponding to the input is terminated. For example, based on obtaining another input for another object different from the object, the electronic device may determine that the context corresponding to the input is terminated. Based on obtaining the other input for the other object different from the object, the electronic device may stop detecting the object.

According to an embodiment, the electronic device may determine whether to continue and/or terminate the context based on the input of the user. For example, the electronic device may determine whether to continue and/or terminate the context based on the object corresponding to the input of the user. When the input includes a control command for the object, it may be determined that the object corresponds to the input. For example, the electronic device may obtain the input of the user, "Turn on the air conditioner" while detecting the air conditioner in the display region. While detecting the air conditioner in the display region, the electronic device may determine that the context corresponding to the input is continued. Based on detecting that the air conditioner has left the display region, the electronic device may determine that the context corresponding to the input has terminated.

For example, the electronic device may determine a threshold time to continue the context based on the input of the user. For example, when a pronoun is detected in the input of the user, the electronic device may determine the threshold time to continue the context as a first time. When the pronoun is not detected in the input of the user, the electronic device may determine the threshold time to continue the context as a second time that is longer than the first time.

In operation 830, according to an embodiment, the electronic device may output first feedback and second feedback.

Feedback (e.g., the first feedback and the second feedback) may include at least one of visual feedback or auditory feedback. According to an embodiment, the electronic device may output the first feedback independently of the object. The electronic device may output the second feedback on an object related to the second feedback. For example, the electronic device may display the second feedback (e.g., visual feedback) generated based on the object in a region corresponding to each object. In an example, the electronic device may reproduce, for each object, the auditory feedback (e.g., voice output) based on the object.

According to an embodiment, the electronic device may output the second feedback based on a subsequent input of the user. For example, the electronic device may output a graphic representation of an object for which the second feedback is generated. Based on obtaining the subsequent input of the user for selecting a graphic representation, the electronic device may generate the second feedback based on the object corresponding to the graphic representation.

For example, when second feedback based on a first object, second feedback based on a second object, and second feedback based on a third object are generated, the electronic device may output a graphic representation for each of the first object, the second object, and the third object. Based on obtaining the subsequent input of the user for selecting a graphic representation, the electronic device may output the second feedback corresponding to the selected graphic representation. Instead of directly outputting the generated second feedback, the electronic device may notify the user of the generation of the second feedback through the graphic representation and provide an interface that allows the user to select an object for which the second feedback is to be output, thereby preventing or reducing user experience from being degraded by the output of too many pieces of second feedback.

Figure 9:
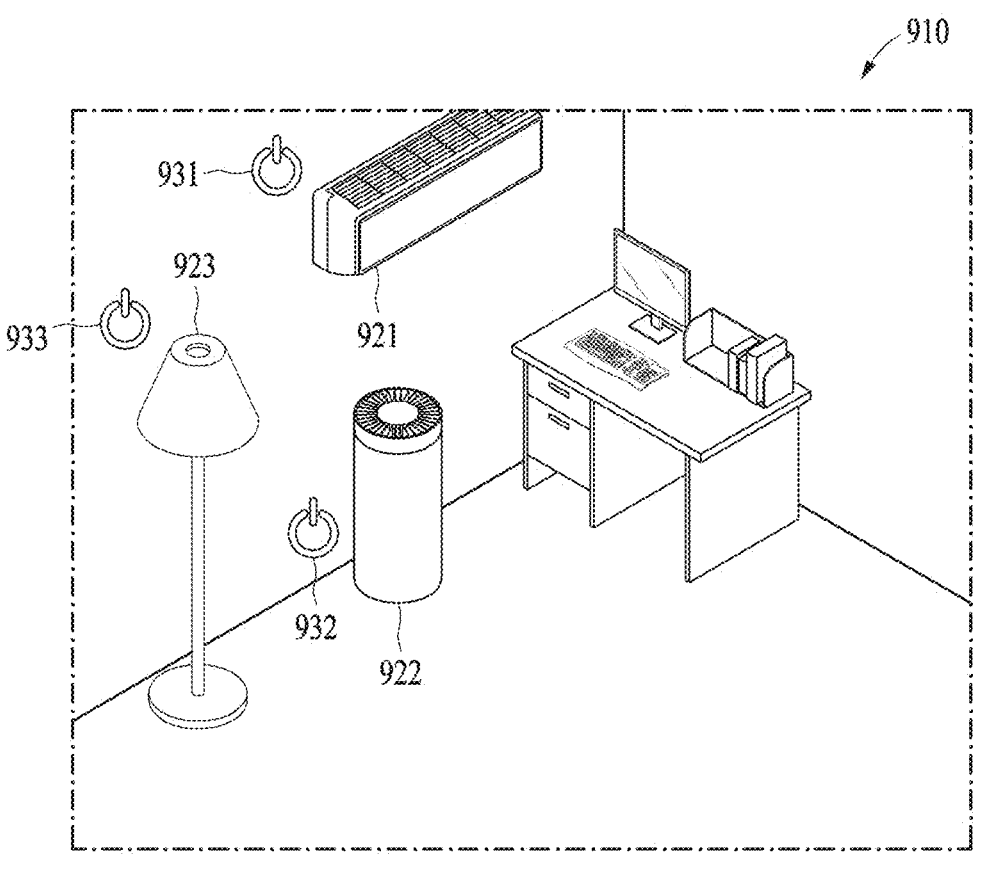
FIG. 9 is a diagram illustrating an example operation of analyzing an additional input by an electronic device when the additional input is obtained, according to various embodiments.

FIG. 9 is a diagram illustrating an example operation of analyzing an additional input by an electronic device when the additional input is obtained, according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) may obtain an additional input of a user, and analyze the additional input based on at least one of the input, first feedback, or second feedback.

In FIG. 9, the electronic device may detect a first object 921, a second object 922, and a third object 923 in a display region 910. The electronic device may obtain an input, "How's the weather today?" from a user.

The electronic device may output first feedback 941, "The highest temperature of today will be 30 degrees and the lowest temperature will be 20 degrees" based on the input of the user.

The electronic device may output second feedback (e.g., first auditory feedback 942-1, second auditory feedback 942-2, and/or third auditory feedback 942-3) based on each object. For example, the electronic device may reproduce first auditory feedback 942-1, "It's hot. How about turning the air conditioner on?" based on the first object 921 (e.g., an air conditioner), and/or display a first graphic representation 931 for turning on the first object 921. The electronic device may reproduce second auditory feedback 942-2, "The air quality is bad. How about turning the air purifier on?" based on the second object 922 (e.g., an air purifier), and/or display a second graphic representation 932 for turning on the second object 922. The electronic device may reproduce third auditory feedback 942-3, "It's cloudy. How about turning the light on?" based on the third object 923 (e.g., light), and/or display a third graphic representation 933 for turning on the third object 923.

The electronic device may obtain an additional input from the user. For example, the electronic device may obtain the additional input from the user while a context corresponding to the input is continued. The electronic device may analyze the additional input using at least one of the input, the first feedback 941, or the second feedback 942. The electronic device may discern an intent of the user corresponding to the additional input by analyzing the additional input.

For example, the electronic device may obtain the additional input, "The air conditioner" from the user. The electronic device may analyze the intent of the user based on the additional input, "The air conditioner" using at least one of the input, "How's the weather today?", the first feedback 941 (e.g., "The highest temperature of today will be 30 degrees and the lowest temperature will be 20 degrees"), or the second feedback (e.g., "It's hot. How about turning the air conditioner on?", "The air quality is bad. How about turning the air purifier on?", It's cloudy. How about turning the light on?", the first graphic representation 931, the second graphic representation 932, or the third graphic representation 933). The electronic device may determine the intent of the user according to the additional input is to turn the air conditioner on, based on "It's hot. How about turning the air conditioner on?" among the second feedback 942 and/or the first graphic representation 931. The electronic device may transmit a turn-on command to the air conditioner. Based on receiving the turn-on command from the electronic device, the air conditioner may start operating.

The electronic device may obtain the additional input from the user after the context corresponding to the input is terminated. The electronic device may exclude at least one of the input, the first feedback 941, or the second feedback 942 from analyzing the additional input obtained after the context is terminated. For example, when the additional input is obtained after the context is terminated, the electronic device may not use the input, the first feedback 941, and the second feedback 942 to analyze the additional input.

For example, based on obtaining the additional input, "The air conditioner" after the context is terminated, the electronic device may not use the input, "How's the weather today?", the first feedback 941 (e.g., "The highest temperature of today will be 30 degrees and the lowest temperature will be 20 degrees"), or the second feedback (e.g., "It's hot. How about turning the air conditioner on?", "The air quality is bad. How about turning the air purifier on?", It's cloudy. How about turning the light on?", the first graphic representation 931, the second graphic representation 932, or the third graphic representation 933) to analyze the additional input. As a result, the electronic device may not discern the intent of the user as to turn on the air conditioner based on the additional input, "The air conditioner", unlike a case in which the additional input is obtained while the context corresponding to the input is continued.

Figure 10A:
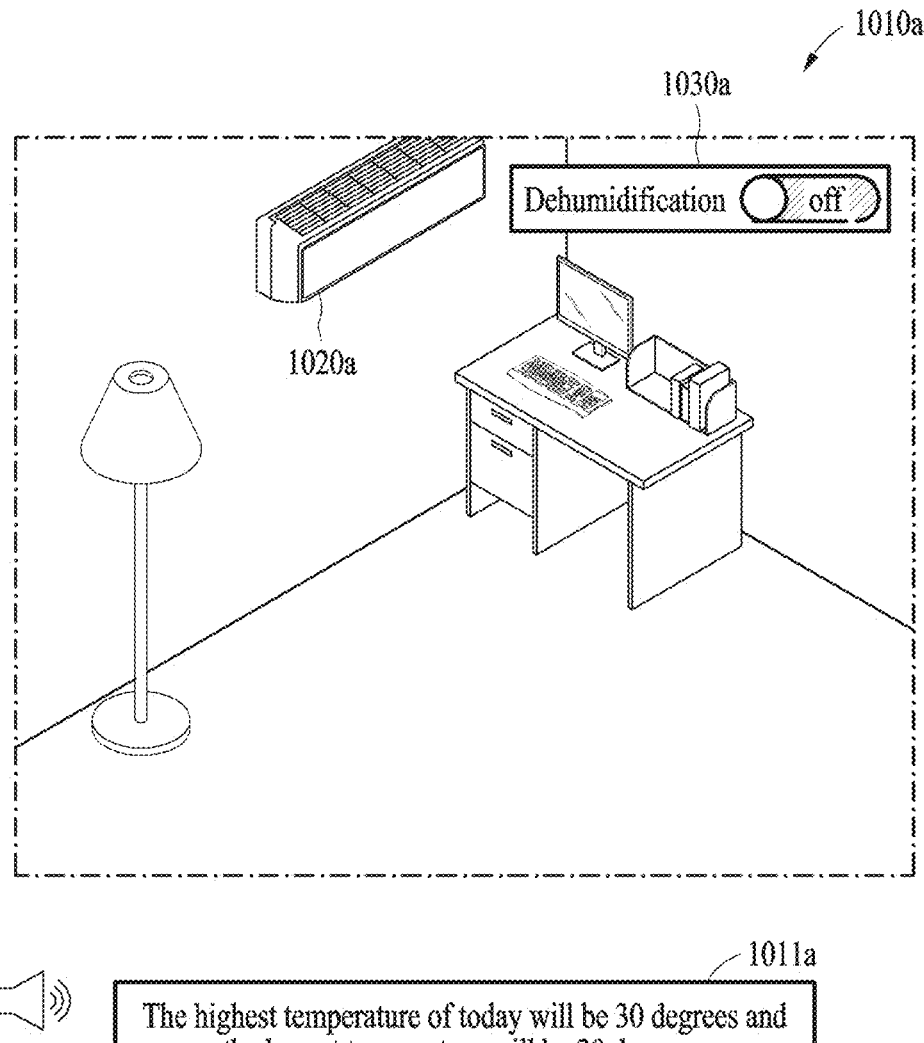
FIGS. 10A and 10B are diagrams illustrating an example operation of outputting an interface for an object by an electronic device according to various embodiments.
Figure 10B:
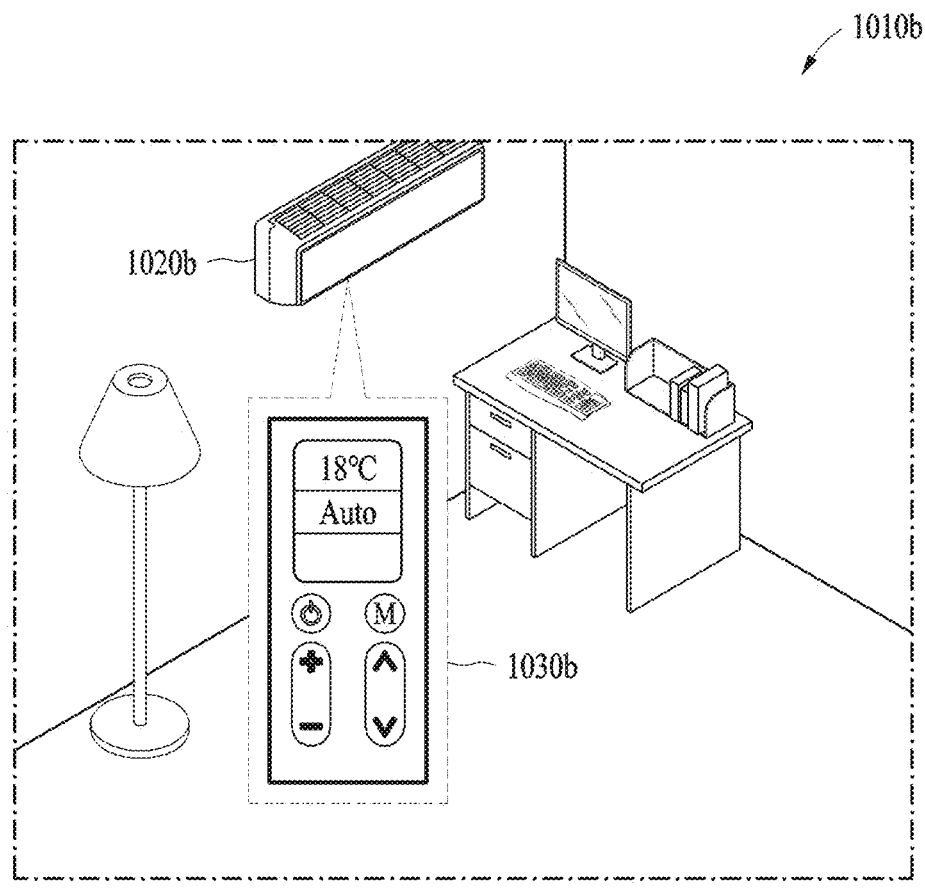

FIGS. 10A and 10B are diagrams illustrating an example operation of outputting an interface for an object by an electronic device according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) may output an interface for a detected object.

In FIG. 10A, the electronic device may detect an object (e.g., an air conditioner 1020a) in a display region 1010a. The electronic device may obtain an input, "How's the weather today?" from a user.

The electronic device may output first feedback 1011a, "The highest temperature of today will be 30 degrees and the lowest temperature will be 20 degrees" based on the input of the user.

The electronic device may output second feedback 1012a based on an object. For example, the electronic device may output the second feedback 1012a, "The humidity of today is 95%. How about operating the air conditioner in a dehumidification mode?", based on the object (e.g., the air conditioner 1020a).

According to an embodiment, the electronic device may generate and/or output an interface 1030a for controlling the object. The interface 1030a may include the interface 1030a for obtaining a control input for an operation related to an input among operations of the object. For example, based on the context corresponding to the input being continued, the electronic device may output the interface 1030a for the operation related to the input among the operations of the object.

The electronic device may determine an operation of an object based on at least one of the input, the first feedback, or the second feedback among candidate operations that may be supported by the object. For example, the electronic device may determine the operation related to the input among the candidate operations. The electronic device may output the interface 1030a for obtaining the additional input for the determined operation. The electronic device may exclude information about an operation other than the determined operation among the candidate operations from the interface 1030a.

For example, in FIG. 10A, the candidate operations that may be supported by the air conditioner 1020a may include, for example, one of a work start operation in a dehumidification mode, a work start operation in a cooling mode, a work end operation, a desired temperature adjustment operation, a wind direction adjustment operation, a mode change operation between the dehumidification mode and the cooling mode, or a scheduled setting operation. The electronic device may determine the work start operation in the dehumidification mode among the candidate operations for the air conditioner 1020*a* as the operation related to the input, based on at least one of the input (e.g., "How's the weather today?") or the second feedback 1012*a* (e.g., "The humidity of today is 95%. How about operating the air conditioner 1020*a* in the dehumidification mode?"). The electronic device may display the interface 1030*a* for the work start operation in the dehumidification mode in a region corresponding to the air conditioner 1020*a*. The electronic device may exclude information about the other operations (e.g., the work start operation in the cooling mode, the work end operation, the desired temperature adjustment operation, the wind direction adjustment operation, the mode change operation between the dehumidification mode and the cooling mode, or the scheduled setting operation) from the interface 1030*a*.

The electronic device may display the interface 1030*a* for the determined operation (e.g., the operation related to the input), and exclude the other operations (e.g., the operations not related to the input) of the object from the interface 1030*a* to output a simple interface 1030*a*.

Herein, the second feedback 1012*a* and the interface 1030*a* are generally described separately, however, embodiments are not limited thereto. The second feedback 1012*a* may include the interface 1030*a* for the operation related to the input of the object.

According to an embodiment, based on the context corresponding to the input being terminated, the electronic device may output an interface 1030*b* to control the object independently of the input. For example, in FIG. 10B, the electronic device may obtain an input "How's the weather today?", and determine that the context corresponding to the input "How's the weather today?" is terminated. The electronic device may detect an air conditioner 1020*b* in a display region. The electronic device may display the interfaces 1030*b* to control the air conditioner 1020*b* independently of the input, the first feedback, and the second feedback. After the context is terminated, the interface 1030*b* for both the operation related to the input and the operation not related to the input may be output.

Figure 11:
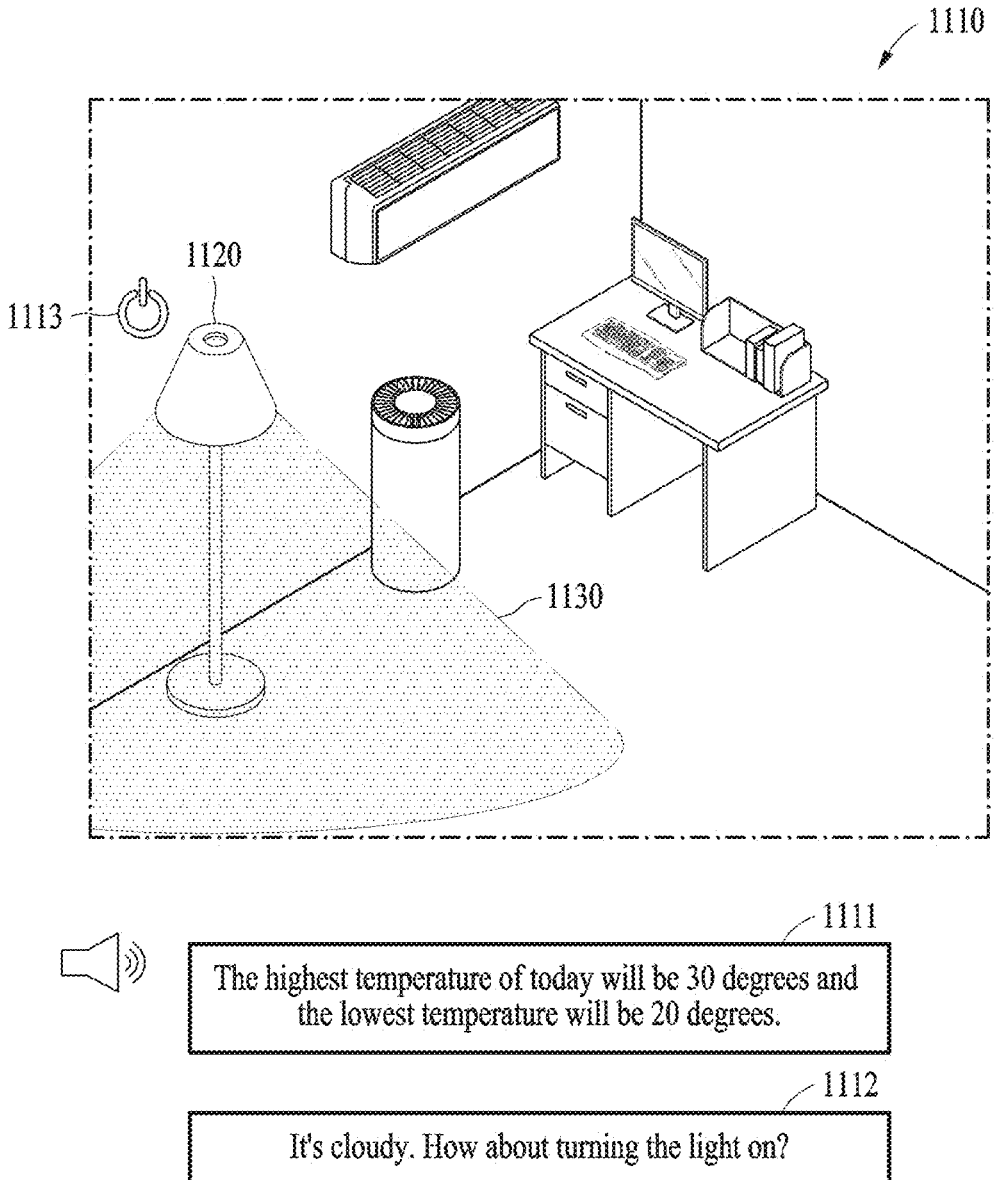
FIG. 11 is a diagram illustrating an example operation of outputting a preview of an operation of an object by an electronic device according to various embodiments.

FIG. 11 is a diagram illustrating an example operation of outputting a preview of an operation of an object by an electronic device according to various embodiments.

An electronic device (e.g., the electronic device 101 of FIG. 1, the electronic device 201 of FIG. 2, the electronic device 301 of FIG. 3, the electronic device 401 of FIGS. 4A and 4B, the electronic device 501 of FIG. 5, or the electronic device 701 of FIG. 7) may output a preview 1130 of an operation of a detected object.

For example, in FIG. 11, the electronic device may detect an object (e.g., a lighting device 1120) in a display region 1110. The electronic device may obtain an input, "How's the weather today?" from the user.

The electronic device may output first feedback 1111, "The highest temperature of today will be 30 degrees and the lowest temperature will be 20 degrees" based on the input of the user.

The electronic device may output second feedback (e.g., auditory feedback 1112) based on the object. The electronic device may reproduce the auditory feedback 1112, "It's cloudy. How about turning the light on?" based on the lighting device 1120, and/or display a graphic representation 1113 for a command to turn on the lighting device 1120.

According to an embodiment, the electronic device may determine the operation of the object among candidate objects that may be supported by the object, based on at least one of the input, the first feedback 1111, or the second feedback. For example, the electronic device may determine an operation related to the input among the candidate operations. The electronic device may output the preview 1130 of the object performing the determined operation.

For example, in FIG. 11, the electronic device may determine a turn-on operation of the lighting device 1120 as the operation related to the input among candidate operations (e.g., a turn-on operation, a turn-off operation, a brightness adjustment operation, and a light color adjustment operation) that may be supported by the lighting device 1120, based on the input, "How's the weather today?" or the second feedback (e.g., the auditory feedback 1112, "It's cloudy. How about turning the light 1120 on?", or the graphic representation 1113 for a command to turn on the lighting device 1120). The electronic device may generate and/or output the preview 1130 of the lighting device 1120 performing the turn-on operation. In FIG. 11, when the lighting device 1120 performs the turn-on operation, the electronic device may output the preview 1130 of at least a portion of the display region 1110 becoming bright.

Herein, the second feedback (e.g., the auditory feedback 1112 or the graphic representation 1113) and the preview 1130 are generally described separately, however, embodiments are not limited thereto. The second feedback may include the preview 1130 of the object performing the operation related to the input.

According to an embodiment, the electronic device may output the preview 1130 of the object performing the determined operation (e.g., the operation related to the input) while the context corresponding to the input is continued. Based on the context corresponding to the input being terminated, the electronic device may stop outputting the preview 1130 of the object performing the determined operation (e.g., the operation related to the input).

In an example embodiment, an electronic device 101; 201; 301; 401; 501; 701 may include a memory 130 configured to store computer-executable instructions, and a processor 120 configured to execute the instructions by accessing the memory 130. The instructions may be configured to, when executed, cause the processor 120 to generate, based on obtaining an input of a user, first feedback 661*a*; 661*b*; 941; 1011*a* on the input, generate, based on an object detected in at least one of a display region 600*a*; 600*b*; 910; 1010*a*; 1010*b*; 1110, a surrounding physical space, or a virtual space, second feedback 662*a*-1; 662*a*-2; 662*b*; 1012*a* following the first feedback 661*a*; 661*b*; 941; 1011*a*, and output the first feedback 661*a*; 661*b*; 941; 1011*a* and the second feedback 662*a*-1; 662*a*-2; 662*b*; 1012*a*.

In an example embodiment, the instructions may be configured to, when executed, cause the processor 120 to detect a candidate object in at least one of the display region 600*a*; 600*b*; 910; 1010*a*; 1010*b*; 1110, the surrounding physical space, or the virtual space, calculate a relevance score of the input and each candidate object, and determine the object based on the calculated relevance score.

In an example embodiment, the instructions may be configured to, when executed, cause the processor 120 to detect the object while a context corresponding to the input is continued from a time point at which the input is obtained, and, based on the context corresponding to the input being terminated, stop detecting the object.

In an example embodiment, the instructions may be configured to, when executed, cause the processor 120 to, based on obtaining another input for another object different from the object, stop detecting the object.

In an example embodiment, the instructions may be configured to, when executed, cause the processor 120 to determine a space where the user is located at a time point at which the input is obtained, detect the object in the display region 600a; 600b; 910; 1010a; 1010b; 1110 while the user is located in the determined space, and, based on the user leaving the determined space, stop detecting the object.

In an example embodiment, the instructions may be configured to, when executed, cause the processor 120 to detect, based on detecting a motion of the user corresponding to the input, the object in the display region 600a; 600b; 910; 1010a; 1010b; 1110 while detecting the motion, and, based on detecting an end of the motion, stop detecting the object.

In an example embodiment, the instructions may be configured to, when executed, cause the processor 120 to, based on failure of detection of an object associated with the input for a threshold period of time from a time point at which the input is obtained, stop detecting the object.

In an example embodiment, the instructions may be configured to, when executed, cause the processor 120 to, based on obtaining an additional input from the user, analyze the additional input additionally using at least one of the input, the first feedback 661a; 661b; 941; 1011a, or the second feedback 662a-1; 662a-2; 662b; 1012a along with the additional input.

In an example embodiment, the instructions may be configured to, when executed, cause the processor 120 to determine an operation of the object among candidate operations supportable by the object, based on at least one of the input, the first feedback 661a; 661b; 941; 1011a, or the second feedback 662a-1; 662a-2; 662b; 1012a, output an interface 1030a for obtaining an additional input for the determined operation, and exclude information about another operation different from the determined operation among the candidate operations from the interface 1030a.

In an example embodiment, the instructions may be configured to, when executed, cause the processor 120 to determine an operation of the object among candidate operations supportable by the object, based on at least one of the input, the first feedback 661a; 661b; 941; 1011a, or the second feedback 662a-1; 662a-2; 662b; 1012a, and output a preview 1130 of the object performing the determined operation.

In an example embodiment, a method performed by an electronic device 101; 201; 301; 401; 501; 701 may include generating, based on obtaining an input of a user, first feedback 661a; 661b; 941; 1011a on the input, generating, based on an object detected in at least one of a display region 600a; 600b; 910; 1010a; 1010b; 1110, a surrounding physical space, or a virtual space, second feedback 662a-1; 662a-2; 662b; 1012a following the first feedback 661a; 661b; 941; 1011a, and outputting the first feedback 661a; 661b; 941; 1011a and the second feedback 662a-1; 662a-2; 662b; 1012a.

In an example embodiment, the generating of the second feedback may include detecting a candidate object in at least one of the display region 600a; 600b; 910; 1010a; 1010b; 1110, the surrounding physical space, or the virtual space, calculating a relevance score of the input and each candidate object, and determining the object based on the calculated relevance score.

In an example embodiment, the generating of the second feedback may include detecting the object while a context corresponding to the input is continued from a time point at which the input is obtained, and, based on the context corresponding to the input being terminated, stopping detecting the object.

In an example embodiment, the generating of the second feedback may include, based on obtaining another input for another object different from the object, stopping detecting the object.

In an example embodiment, the generating of the second feedback may include determining a space where the user is located at a time point at which the input is obtained, detecting the object in the display region 600a; 600b; 910; 1010a; 1010b; 1110 while the user is located in the determined space, and, based on the user leaving the determined space, stopping detecting the object.

In an example embodiment, the generating of the second feedback may include detecting, based on detecting a motion of the user corresponding to the input, the object in the display region 600a; 600b; 910; 1010a; 1010b; 1110 while detecting the motion, and, based on detecting an end of the motion, stopping detecting the object.

In an example embodiment, the generating of the second feedback may include, based on failure of detection of an object associated with the input for a threshold period of time from a time point at which the input is obtained, stopping detecting the object.

In an example embodiment, the method may further include, based on obtaining an additional input from the user, analyzing the additional input additionally using at least one of the input, the first feedback 661a; 661b; 941; 1011a, or the second feedback 662a-1; 662a-2; 662b; 1012a along with the additional input.

In an example embodiment, the method may further include determining an operation of the object among candidate operations supportable by the object, based on at least one of the input, the first feedback 661a; 661b; 941; 1011a, or the second feedback 662a-1; 662a-2; 662b; 1012a, outputting an interface 1030a for obtaining an additional input for the determined operation, and excluding information about another operation different from the determined operation among the candidate operations from the interface 1030a.

The electronic device according to example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., by wire), wirelessly, or via a third component.

As used in connection with embodiments of the disclosure, the term "module" may include a unit implemented in hardware, software, or firmware, and combinations thereof, and may interchangeably be used with other terms, for example, "logic," "logic block," "part," or "circuitry." A module may be a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101) For example, at least one processor (e.g., the processor 120) of the machine (e.g., the electronic device 101) may, individually and/or collectively, invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

The embodiments described herein may be implemented using a hardware component, a software component, and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device (e.g., at least one processor including processing circuitry) to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
memory configured to store computer-executable instructions; and
at least one processor-, comprising processing circuitry, individually and/or collectively, configured to:
obtain, an input of a user;
generate, based on the input, first feedback on the input;
detect an object related the input, in at least one of a display region, a surrounding physical space, or a virtual space;
generate, based on the input and the object, second feedback following the first feedback;
output the first feedback and the second feedback;
classify candidate operations supportable by the object into operation related to the input and operation not related to the input;
while a context corresponding to the input is continued, output a first interface for the operation related to the input, wherein operation not related to the input is excluded from the first interface; and
after the context corresponding to the input is terminated, output a second interface for all candidate operations supportable by the object, including the operation related to the input and the operation not related to the input.

2. The electronic device of claim 1, wherein at least one processor, individually and/or collectively, is configured to:
detect a candidate object in at least one of the display region, the surrounding physical space, or the virtual space;
calculate a relevance score of the input and each candidate object;
determine the detected object based on the calculated relevance score;
based on failure of detection of an object associated with the input for a threshold period of time from a time point at which the input is obtained, stop detecting the object;
determine an operation of the object among the candidate operations supportable by the object, based on at least one of the input, the first feedback, or the second feedback; and
output a preview of the object performing the determined operation.

3. The electronic device of claim 1, wherein at least one processor, individually and/or collectively, is configured to:
generate the first feedback independently of the object, such that the identical first feedback is generated both when a first object is detected in the display region and when a second object different from the first object is detected in the display region; and
generate the second feedback dependently of the object, such that different second feedbacks are generated when a first object is detected in a display region and when a second object is detected in the display region.

4. The electronic device of claim 1, wherein the second feedback comprises at least one of feedback of suggesting a control command for the object to the user, feedback of displaying an interface for obtaining the control command for the object, feedback of suggesting an action of the user for the object, feedback of providing a preview of the control command for the object, feedback of providing a preview of the action for the object, or feedback of providing additional information for the object.

5. The electronic device of claim 1, wherein at least one processor, individually and/or collectively, is configured to:
determine a space where the user is located at a time point at which the input is obtained;
detect the object in the display region while the user is located in the determined space;
while the user is located in the space, determine that the context corresponding to the input is continued and output the first interface; and
based on the user leaving the determined space, determine that the context corresponding to the input is terminated and output the second interface.

6. The electronic device of claim 1, wherein at least one processor, individually and/or collectively, is configured to:
detect a motion of the user during a period of time including a time point at which the input is obtained;
while detecting the motion, determine that the context corresponding to the input is continued and output the first interface; and
based on detecting an end of the motion, determine that the context corresponding to the input is terminated and output the second interface.

7. The electronic device of claim 1, wherein at least one processor, individually and/or collectively, is configured to:
while the object is detected in the display region, determine that the context corresponding to the input is continued and output the first interface; and
based on failing to detect the object in the display region, determine that the context corresponding to the input is terminated and output the second interface.

8. The electronic device of claim 1, wherein at least one processor, individually and/or collectively, is configured to:
obtain an additional input from the user;
based on obtaining the additional input while the context corresponding to the input is continued, analyze the additional input using at least one of the input, the first feedback, or the second feedback along with the additional input; and
based on obtaining the additional input after the context corresponding to the input is terminated, exclude the input, the first feedback, and the second feedback from analyzing the additional input.

9. The electronic device of claim 1, wherein at least one processor, individually and/or collectively, is configured to:
obtain a subsequent input of the user, after outputting the first feedback and the second feedback;
determine whether subsequent input is associated with the object;
based on the subsequent input being associated with the object, determine that the context corresponding to the input is continued and output the first interface; and
based on the subsequent input being not associated with the object, determine that the context corresponding to the input is terminated and output the second interface.

10. The electronic device of claim 1, wherein at least one processor, individually and/or collectively, is configured to:
detect a plurality of objects related the input;

generate a plurality of second feedbacks respectively corresponding to the plurality of objects;

output a plurality of graphic representations for each of the plurality of objects;

obtain a subsequent input of the user for selecting a graphic representation; and output a selected second feedback corresponding to the selected graphic representation, among from the plurality of second feedbacks.

11. A method performed by an electronic device, the method comprising:

obtaining, an input of a user;

generating, based on the input, first feedback on the input;

detecting an object related the input, in at least one of a display region, a surrounding physical space, or a virtual space;

generating, based on the input and the object, second feedback following the first feedback;

outputting the first feedback and the second feedback;

classifying candidate operations supportable by the object into operation related to the input and operation not related to the input;

while a context corresponding to the input is continued, outputting a first interface for the operation related to the input, wherein operation not related to the input is excluded from the first interface; and after the context corresponding to the input is terminated, outputting a second interface for all candidate operations supportable by the object, including the operation related to the input and the operation not related to the input.

12. The method of claim 11, wherein the generating of the second feedback comprises:

detecting a candidate object in at least one of the display region, the surrounding physical space, or the virtual space;

calculating a relevance score of the input and each candidate object;

determining the detected object based on the calculated relevance score; and based on failure of detection of an object associated with the input for a threshold period of time from a time point at which the input is obtained, stopping detecting the object, wherein the method further comprises:

determining an operation of the object among the candidate operations supportable by the object, based on at least one of the input, the first feedback, or the second feedback; and outputting a preview of the object performing the determined operation.

13. The method of claim 11, wherein the generating of the first feedback comprises:

generating the first feedback independently of the object, such that the identical first feedback is generated both when a first object is detected in the display region and when a second object different from the first object is detected in the display region; and wherein the generating of the second feedback comprises:

generating the second feedback dependently of the object, such that different second feedbacks are generated when a first object is detected in a display region and when a second object is detected in the display region.

14. The method of claim 11, wherein the second feedback comprises at least one of feedback of suggesting a control command for the object to the user, feedback of displaying an interface for obtaining the control command for the object, feedback of suggesting an action of the user for the object, feedback of providing a preview of the control command for the object, feedback of providing a preview of the action for the object, or feedback of providing additional information for the object.

15. The method of claim 11, wherein the method further comprises:

determining a space where the user is located at a time point at which the input is obtained;

detecting the object in the display region while the user is located in the determined space;

while the user is located in the space, determining that the context corresponding to the input is continued and outputting the first interface; and based on the user leaving the determined space, determining that the context corresponding to the input is terminated and outputting the second interface.

16. The method of claim 11, further comprises:

detecting a motion of the user during a period of time including a time point at which the input is obtained;

while detecting the motion, determining that the context corresponding to the input is continued and outputting the first interface; and based on detecting an end of the motion, determining that the context corresponding to the input is terminated and outputting the second interface.

17. The method of claim 11, further comprises:

while the object is detected in the display region, determining that the context corresponding to the input is continued and outputting the first interface; and based on failing to detect the object in the display region, determining that the context corresponding to the input is terminated and outputting the second interface.

18. The method of claim 11, further comprising:

obtaining an additional input from the user;

based on obtaining the additional input while the context corresponding to the input is continued, analyzing the additional input using at least one of the input, the first feedback, or the second feedback along with the additional input; and based on obtaining the additional input after the context corresponding to the input is terminated, excluding the input, the first feedback, and the second feedback from analyzing the additional input.

19. The method of claim 11, further comprising:

obtaining a subsequent input of the user, after outputting the first feedback and the second feedback;

determining whether subsequent input is associated with the object;

based on the subsequent input being associated with the object, determining that the context corresponding to the input is continued and outputting the first interface; and based on the subsequent input being not associated with the object, determining that the context corresponding to the input is terminated and outputting the second interface.

20. A non-transitory computer-readable storage medium storing instructions that, when executed by a processor, cause the processor to perform the method of claim 11.

* * * * *